United States Patent [19]

Ishigaki et al.

[11] 4,012,771
[45] Mar. 15, 1977

[54] APPARATUS FOR RECORDING AND/OR REPRODUCING COLOR VIDEO SIGNALS

[75] Inventors: Yoshio Ishigaki, Tokyo; Takao Tsuchiya, Fujisawa; Tsutomu Niimura, Tokyo, all of Japan

[73] Assignee: Sony Corporation, Tokyo, Japan

[22] Filed: Jan. 23, 1976

[21] Appl. No.: 651,791

Related U.S. Application Data

[63] Continuation-in-part of Ser. No. 544,831, Jan. 28, 1975, abandoned.

[30] Foreign Application Priority Data

Feb. 5, 1974  Japan .......................... 49-14746

[52] U.S. Cl. .................................................. 358/4
[51] Int. Cl.² ..................................... H04N 5/79
[58] Field of Search ............. 358/4; 360/18, 20, 33, 360/34, 8, 9, 24, 55

[56] References Cited

UNITED STATES PATENTS 3,812,523   5/1974   Narahara ........................ 358/4

Primary Examiner—John C. Martin
Attorney, Agent, or Firm—Lewis H. Eslinger; Alvin Sinderbrand

[57] ABSTRACT

In apparatus for reproducing color video signals recorded in successive parallel tracks on a record medium with the chrominance components of video signals recorded in next adjacent tracks having first and second carriers which differ from each other in respect to their phases or polarity characteristics; and in which a plurality of transducers scan along the tracks one at a time so as to reproduce the video signals recorded in each of said tracks along with cross-talk signals from the tracks next adjacent thereto, means for separating said chrominance signal components from the luminance signal component in the reproduced signals, and a signal processing circuit including a switching circuit and a comb filter provides the separated chrominance components of video signals reproduced from each of said tracks with a common carrier and eliminates therefrom the chrominance components of the cross-talk signals on the basis of said different phases of the first and second carriers with which the chrominance components were recorded in the tracks which are next adjacent to each other: the changing-over of the switching circuit is controlled in response to the phase of the chrominance component carrier that results therefrom so as to ensure phase alignment of the common carrier with which the chrominance components of the video signals reproduced from the successive tracks are provided. Further, control signals are recorded on the record medium to identify those tracks in which video signals are recorded with their chrominance components having said first and second carriers, respectively, and, on reproducing, such identifying control signals are reproduced to control the movements of the transducers and, through such controlled movements, to regulate the changing-over of the switching circuit.

28 Claims, 45 Drawing Figures

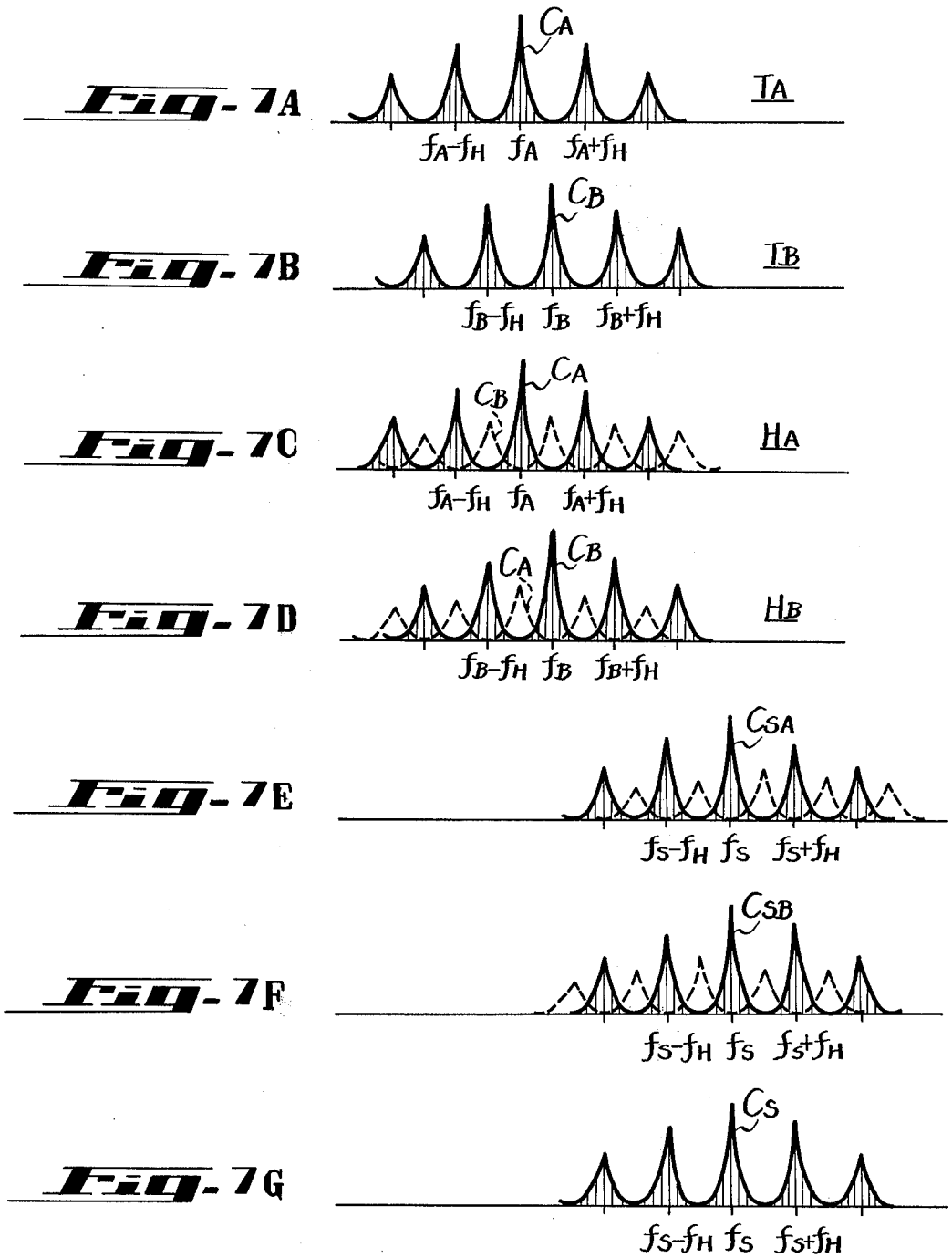

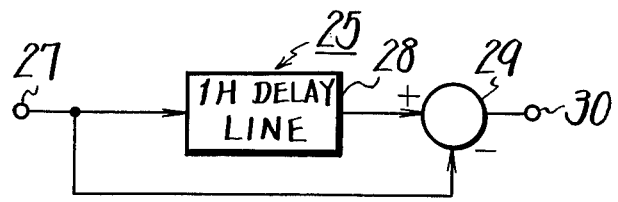
Fig. 8 A
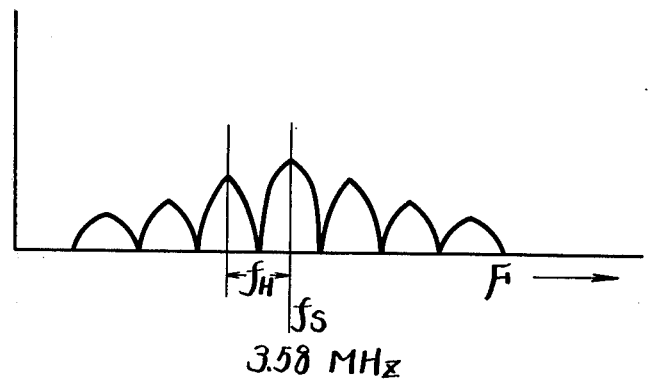
Fig. 8 B
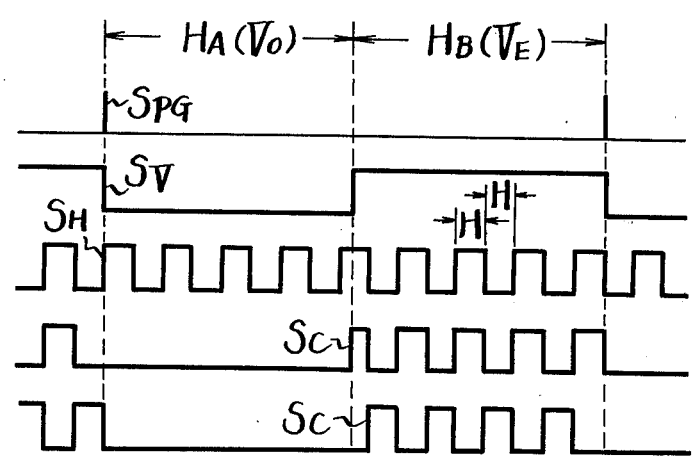
Fig. 9A
Fig. 9B
Fig. 9C
Fig. 9D
Fig. 9E

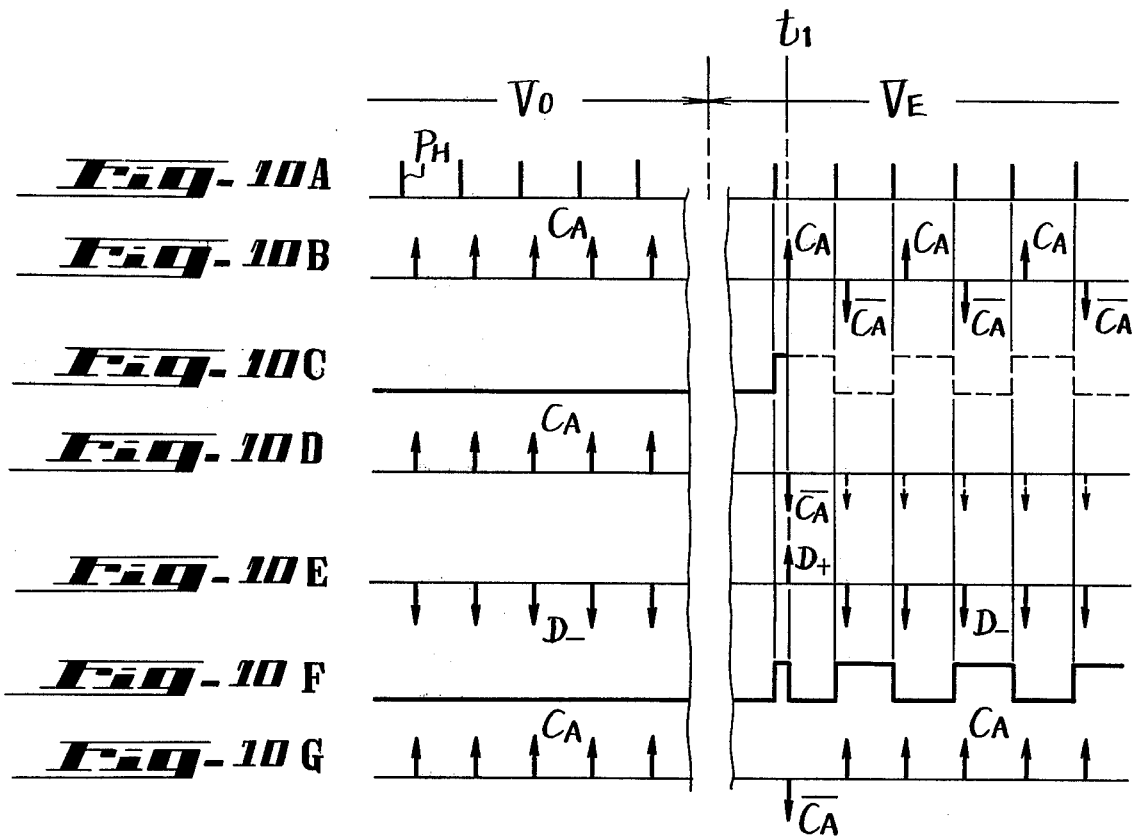
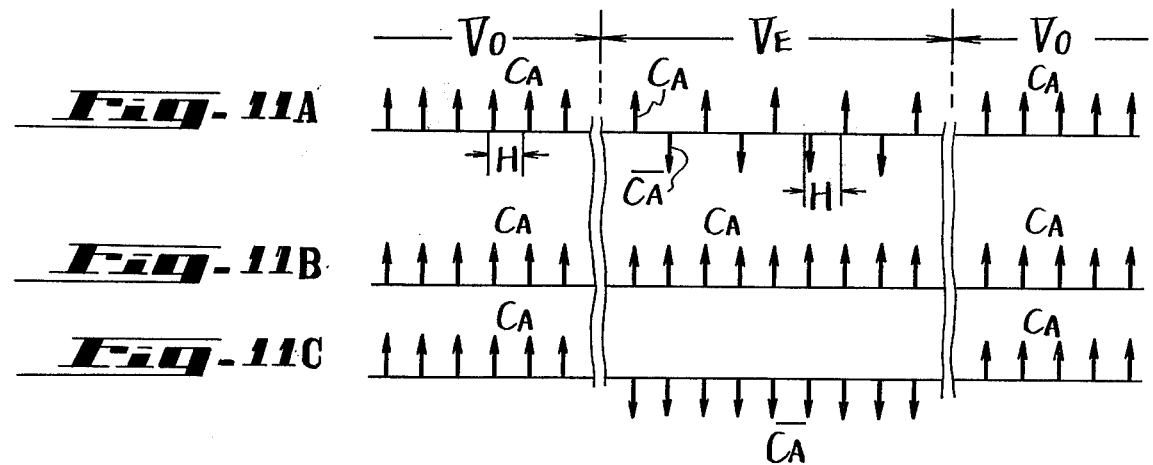

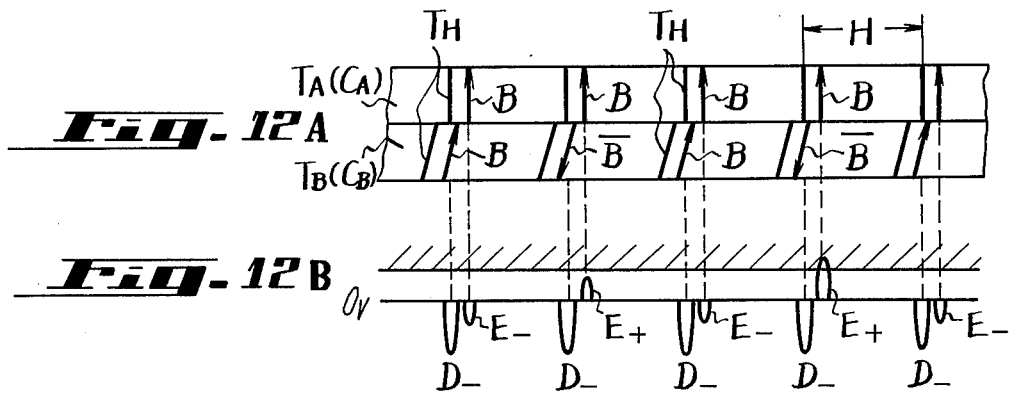
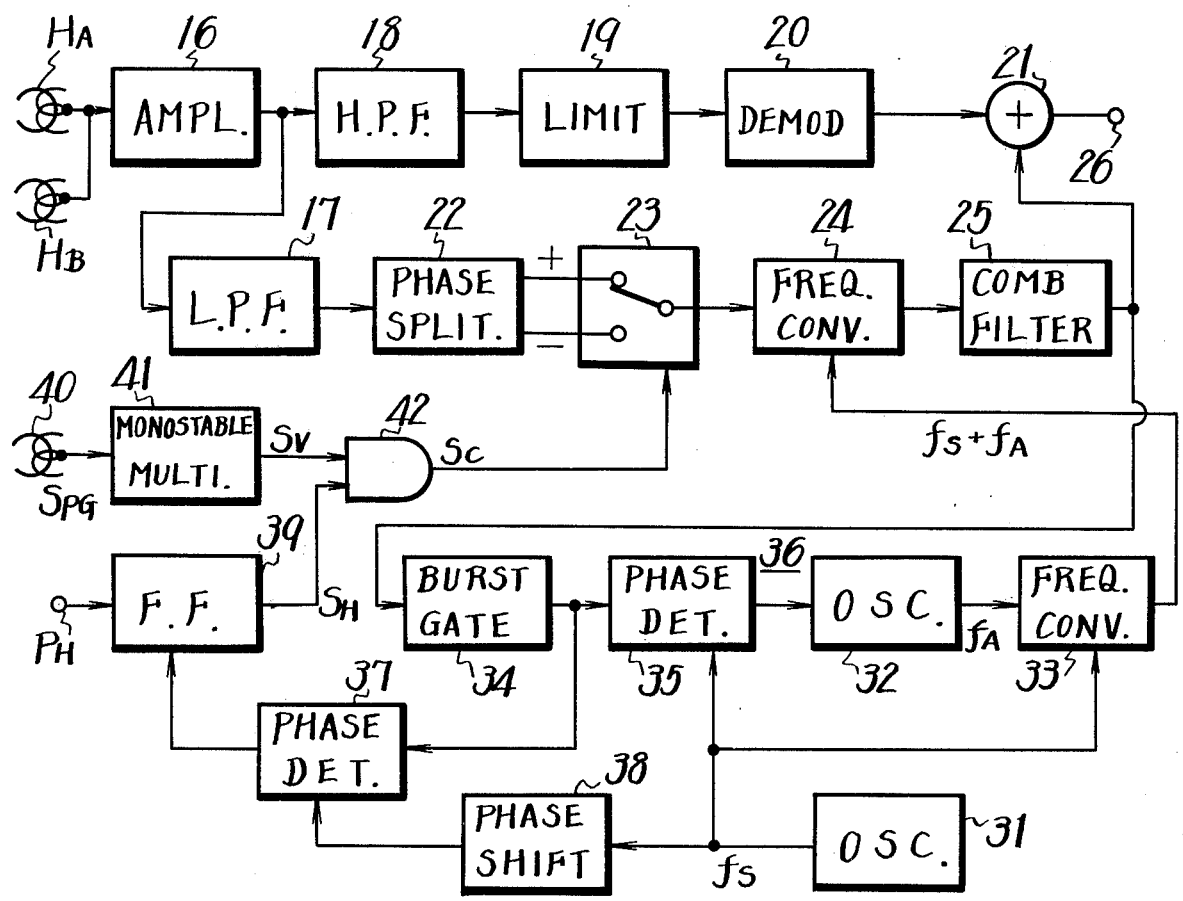

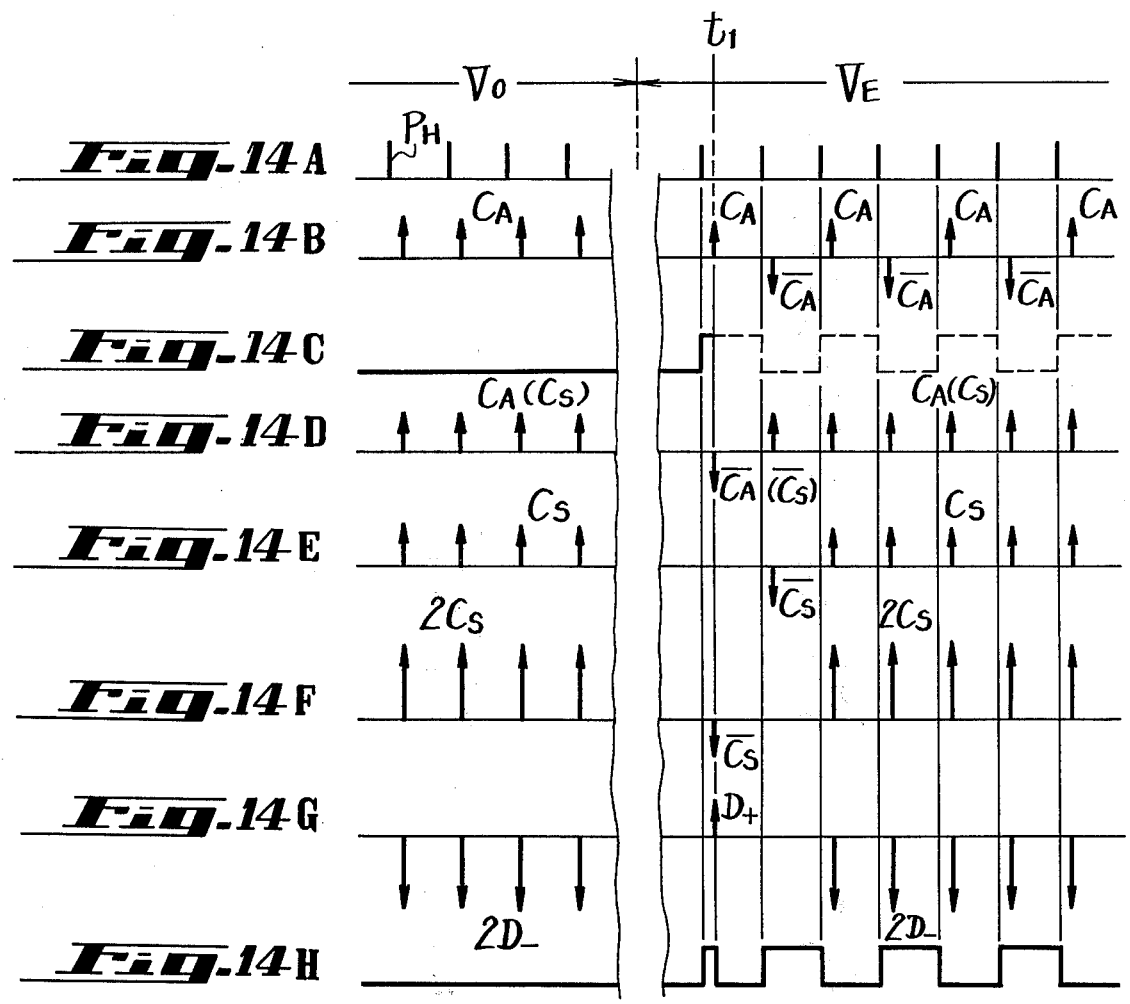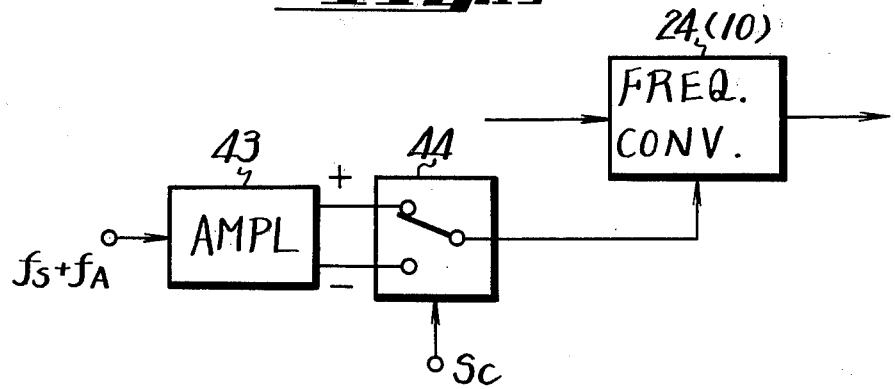

APPARATUS FOR RECORDING AND/OR REPRODUCING COLOR VIDEO SIGNALS

CROSS-REFERENCE TO RELATED APPLICATION

This application is a continuation-in-part of U.S. patent application Ser. No. 544,831, filed Jan. 28, 1975, now abandoned.

BACKGROUND OF THE INVENTION

1. Field of the Invention

This invention relates generally to the recording and reproduction of information signals, such as, for example, color video signals, and more particularly is directed to the reduction of cross-talk in the reproduction of signals recorded in adjacent tracks, even though the chrominance signal components of color video signals are recorded for every line interval with relatively low frequency carriers and the tracks are in abutting or even overlapping relation, that is, are not provided with guard bands or spaces therebetween.

2. The Prior Art

It is well known to record video signals on magnetic tape or other forms of record medium by scanning successive parallel tracks on the record medium with one or more transducers energized by the video signals. There has been a constant effort to improve the efficiency of use of the record medium by packing the tracks as close together as possible. The packing density has always been limited by, among other things, the fact that, during reproduction of the signals recorded in each of the tracks, the reproducing transducer scanning such track can also pick up signals or cross-talk from adjacent tracks.

One effort made to minimize cross-talk has been to use two transducers having air gaps with different azimuth angles for recording and reproducing the video signals in successive tracks. This is relatively easy to do because most magnetic recording and/or reproducing apparatus for video signals includes a rotary drum provided with two transducers or heads which can have gaps with different azimuth angles. The tape is wrapped helically about a portion of the perimeter of the drum and moved longitudinally along this helical path while the transducers or heads are rotated, thus bringing the heads alternately into operative relationship with the tape and allowing each head to trace or scan a respective one of the tracks. By recording successive alternate tracks with transducers or heads having different azimuth angles, and by reproducing the signals recorded in such tracks by means of reproducing transducers or heads which also have corresponding azimuth angles, the well-known azimuth loss will reduce or attenuate the cross-talk. That is, when one of the reproducing transducers having a respective azimuth angle scans a track in which signals were recorded by a transducer having the same azimuth angle, azimuth loss will reduce the affect on the output of such reproducing transducer of signals which were recorded in adjacent tracks by a transducer or head having a different azimuth angle. However, such azimuth loss is generally proportional to the frequency of the signals being reproduced, and this practically limits the extent to which azimuth loss can be relied upon to substantially reduce or eliminate cross-talk in the reproducing of color video signals recorded in closely adjacent, abutting or overlapping tracks.

As is well-known, when recording color video signals, it is the common practice to frequency modulate the luminance component of the color video signal and to frequency convert the chrominance component to occupy a frequency band below that of the frequency modulated luminance component, whereupon, the frequency modulated luminance component and the frequency converted chrominance component are combined for recording on a magnetic tape or other record medium. Thus, when reproducing such recorded video signals, interference due to cross-talk from low frequency signals, such as, the frequency converted chrominance component, is not reduced to the same degree by the use of transducers having different azimuth angles as cross-talk from high frequency signals, such as, the frequency modulated luminance signal component.

A proposal for minimizing cross-talk of low frequency information is disclosed in U.S. Pat. No. 3,821,787 which has a common assignee herewith. In accordance with such proposal, the relatively high frequency luminance components are recorded during every line area increment on every track, but the low frequency chrominance components are not recorded in adjacent line increment areas of adjacent tracks, that is, the chrominance components are recorded only intermittently. In reproducing signals recorded, as aforesaid, the components that were recorded only intermittently are utilized directly upon reproduction and are also delayed for the length of time necessary to permit them to be used during the next succeeding interval in which similar information is not recorded. This system reduces the cross-talk interference but at some sacrifice in the quality of the reproduced image, due to the fact that less than all of the available information is recorded.

More recently it has been proposed, for example, as disclosed in U.S. patent application Ser. No. 492,330, filed July 26, 1974, now abandoned, and in U.S. patent application Ser. No. 634,668, filed Jan. 23, 1976, which is a continuation of U.S. patent application Ser. No. 492,330, and having a common assignee herewith, that interference or cross-talk between color video signals recorded in adjacent tracks may be reduced or eliminated during reproduction by recording the chrominance components with different first and second carriers in the adjacent tracks, respectively. Such first and second carriers modulated by the chrominance components of signals recorded in adjacent tracks, respectively, may be distinguished from each other by their respective phases or polarity characteristics so that, upon reproduction of the signals recorded in a particular track, the cross-talk from the tracks next adjacent thereto can be conveniently suppressed or eliminated by reason of the different phases or polarity characteristics of the carriers with which the chrominance components of the signals were recorded in that particular track and in the next adjacent tracks, respectively. Although the apparatus heretofore provided for recording and/or reproducing color video signals, as aforesaid, is generally effective to eliminate interference due to cross-talk between the chrominance components of video signals recorded in adjacent tracks even when such tracks are closely adjacent, abutting or even overlapping, that is, formed without guard bands therebetween, it has been found that discontinuities may occur in the phase or polarity of the common carrier provided for the reproduced video signals in the course of the processing thereof. Such discontinuities in the phase of the chrominance carrier of the reproduced color video signals cause true deterioration in the picture produced from the reproduced color video signals, and are found to occur primarily at the commencement of the scanning of each record track by the respective reproducing transducer or head. Further, although the heretofore provided apparatus includes an automatic phase control circuit for stabilizing the phase of the common carrier provided for the chrominance components of the reproduced video signals in the course of the processing thereof, such phase stabilization occurs only relatively slowly and, therefore, is not effective to avoid the described hue deterioration.

OBJECTS AND SUMMARY OF THE INVENTION

Accordingly, it is an object of this invention to provide an apparatus for recording and/or reproducing color video signals which avoid the above described defects of the apparatus previously proposed for those purposes.

More specifically, it is an object of this invention to provide an improved apparatus for recording and/or reproducing color video signals in successive parallel tracks on a record medium, and in which such tracks can be abutting or even overlapping, that is, not provided with guard bands therebetween, for optimum utilization of the record medium, and further in which the signals reproduced from successive record tracks are of good resolution or quality, proper phase alignment is maintained in respect to the chrominance carriers of such reproduced signals, and cross-talk from ajdacent tracks is reduced or eliminated.

A more specific object of the invention is to provide an improved color video signal recording and/or reproducing apparatus, as aforesaid, in which both luminance and chrominance components of the color video signal can be recorded in adjacent tracks during every line interval, but in such a way that the cross-talk interference of low frequency or recorded chrominance components is inherently minimized or can be minimized by simple signal processing.

Another specific object of this invention is to provide an apparatus for recording and/or reproducing color video signals, as aforesaid, with devices for controlling the movements of recording and/or reproducing transducers or heads in respect to the record medium, for controlling the selection of the first and second carriers with which the chrominance components of the color video signals are recorded in next adjacent tracks, and for controlling the operation of a signal processor by which the chrominance signal components of video signals reproduced from successive tracks are provided with a common carrier of proper phase alignment while suppressing the chrominance signal components of cross-talk signals from next adjacent tracks.

In accordance with an aspect of this invention, in apparatus for reproducing color video signals recorded in successive parallel tracks on a record medium with the chrominance components of video signals recorded in next adjacent tracks having first and second carriers which differ from each other in respect to their phases or polarity characteristics; a plurality of transducers scan along the tracks one at a time so as to reproduce the video signals recorded in each of said tracks along with cross-talk signals from the tracks next adjacent thereto, said chrominance signal components are separated from the luminance signal component in the reproduced signals, a signal processor including a switching circuit or device and a comb filter provides the separated chrominance components of video signals reproduced from each of said tracks with a common carrier and eliminates therefrom the chrominance components of the cross-talk signals on the basis of said different phases of the first and second carriers with which the chrominance components were recorded in the tracks which are next adjacent to each other, and changing-over of the switching circuit or device is controlled in response to the phase of the chrominance component carrier that results therefrom so as to ensure phase alignment of the common carrier with which the chrominance component of the video signals reproduced from the successive tracks are provided.

It is further a feature of this invention to provide pulse generating means producing pulse signals upon the operative positioning of each of the transducers or heads in respect to the record medium, and to control the changing-over of the switching circuit or device in response to the detected phase of the common carrier provided for the chrominance components or reproduced video signals, the pulse signals representing operative positioning of the transducers and horizontal synchronizing signals separated from the reproduced video signals.

In a preferred embodiment of the invention, control signals are recorded on the record medium to identify those tracks in which video signals are recorded with their chrominance components having said first and second carriers, respectively, and, on reproducing, such identifying control signals are reproduced to control the movements of the transducers and, through such controlled movements, to also regulate the changingover of the switching circuit.

The above and other objects, features and advantages of the invention will be apparent in the following detailed description of illustrative embodiments which is to be read in connection with the accompanying drawings.

BRIEF DESCRIPTION OF THE DRAWINGS

FIGS. 7A to 7G are views showing frequency spectra to which reference will be made in explaining the operation of the apparatus according to this invention;

FIGS. 8A and 8B are respectively a diagramatic view of a comb-filter used in the apparatus according to this invention and the frequency characteristic diagram of such filter;

FIGS. 9A to 9E, 10A to 10G and 11A to 11C are waveform diagrams to which reference will be made in explaining the operation of the apparatus according to this invention;

FIGS. 12A and 12B are diagramatic views to which reference will be made in explaining a problem that may be encountered in the operation of the apparatus of FIG. 1;

FIG. 13 is a view similar to that of FIG. 1, but showing another embodiment of this invention;

FIGS. 14A to 14H are waveform diagrams to which reference will be made in explaining the operation of the apparatus shown on FIG. 13;

FIG. 15 is a block diagram illustrating a modification that may be effected in the embodiments of the invention shown on FIGS. 1 and 13.

DESCRIPTION OF THE PREFERRED EMBODIMENTS

Figure 2:
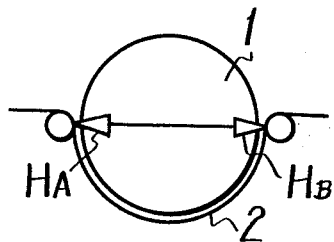
FIG. 2 is a schematic plan view showing the disposition of riotary magnetic heads and a magnetic tape in the apparatus of FIG. 1.
Figure 4:
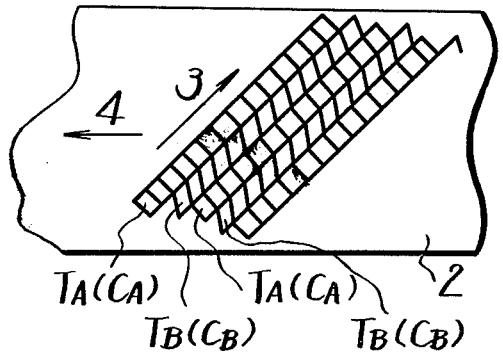
FIG. 4 is a schematic view showing a pattern in which video signals are recorded on a magnetic tape to be used in the reproducing apparatus of FIG. 1.

Referring to the drawings in detail, and initially to FIGS. 2 and 4 thereof, it will be seen that the record medium 2 used in apparatus according to this invention for recording and/or reproducing color video signals may be in the form of a magnetic tape 2 which is wrapped helically part of the way around a drum 1 having rotary transducers or heads $H_A$ and $H_B$ associated therewith and arranged at substantially diametrically opposed locations. Thus, in response to rotary movement of transducers or heads $H_A$ and $H_B$ with drum 1, such heads will alternately move obliquely across tape 2, for example, in the direction of the arrow 3 on FIG. 4, and, if the tape 2 is simultaneously advanced longitudinally, as indicated by the arrow 4, the heads $H_A$ and $H_B$ will alternately scan successive record tracks $T_A$ and $T_B$, respectively. Although only five record tracks are shown on FIG. 4, in the normal recording of signal information on tape 2, there would be a large number of such tracks, with each of the tracks being shown divided into areas or increments by spaced apart lines extending laterally across the respective track. Each of these areas or increments has recorded on it the signal information of one interval, for example, a line interval of a color video signal that is divided into line intervals and field intervals. Usually, but not necessarily, each of the tracks $T_A$ and $T_B$ includes a line increment or area for each line interval of one field of the color video signal.

Each line interval and each field interval contains a blanking and synchronizing signal portion and, in accordance with accepted practice, the tracks $T_A$ and $T_B$ are shown with their line increments arranged in a pattern referred to as H-alignment. This is achieved by regulating the relative movements in the directions 3 and 4 in accordance with the synchronizing signals of the color video signals to be recorded so that the section of each line increment or area of each track $T_A$ on which the blanking and synchronizing signals are recorded is aligned with the section of the abutting increment or area in track $T_B$ on which the blanking and synchronizing signals for that line interval are recorded. The foregoing arrangement of H-alignment reduces the cross-talk of blanking and synchronizing signal information from one track to the other. The tracks $T_A$ and $T_B$ are shown on FIG. 4 to be recorded in such a way that they are contiguous or abutting along their adjacent longitudinal edges, but it is to be understood that such record tracks may be otherwise formed without guard bands therebetween, for example, arranged in overlapping relation. In any event, on FIG. 4, it is assumed that the width of each of the transducers $H_A$ and $H_B$ used to record the tracks $T_A$ and $T_B$, respectively, is exactly equal to the width of the respective track. Generally speaking, signals recorded on contiguous tracks would produce cross-talk interference from one track to the other during reproduction or playback, because the reproducing transducer or head when scanning one track would unavoidably be energized, at least slightly, by the magnetic field of the adjacent track or tracks.

Figure 3:
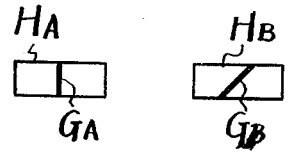
FIG. 3 schematically illustrates the relation of the gaps of two magnetic transducers or heads preferably employed in the apparatus of FIG. 1.

In accordance with accepted practice, the luminance components of color video signals can be treated separately from the chrominance components thereof. More specifically, the luminance components may modulate a carrier so that they are recorded in a higher frequency portion of the available frequency band. If the transducers or heads $H_A$ and $H_B$ employed for recording in the tracks $T_A$ and $T_B$ are provided with their respective gaps $G_A$ and $G_B$ having different azimuth angles, as shown on FIG. 3, and the same azimuth angles are used in transducers respectively reproducing video signals recorded in the tracks $T_A$ and $T_B$, then the well-known azimuth loss would result in attenuation of the higher frequency portion of the signal reproduced from track $T_B$ during the scanning of the track $T_A$. However, in accordance with another accepted or well-known practice, the chrominance components of the color video signals, prior to the recording thereof, are frequency converted from a band around the normal chrominance carrier frequency, which is approximately 3.58 MHz in the case of the NTSC signal, to a relatively low frequency of about 600 or 700 KHz. Since the azimuth loss is generally proportional to the frequency of the signals involved, the interference due to cross-talk from low frequency signals, such as, the frequency-converted chrominance components, is not reduced to the same degree, by the use of transducers having different azimuth angles, as is cross-talk from high frequency signals, such as, the frequency-modulated luminance components. Thus, even if transducers having different azimuth angles are used for the recording of tracks $T_A$ and $T_B$ on FIG. 4, and then for the reproducing of the recorded signals, chrominance information recorded in which track $T_B$ would be picked output terminal by the transducer $H_A$ scanning the adjacent track $T_A$ and would interfere with the chrominance information reproduced from such track $T_A$, and the reverse would also be true.

Figure 5:
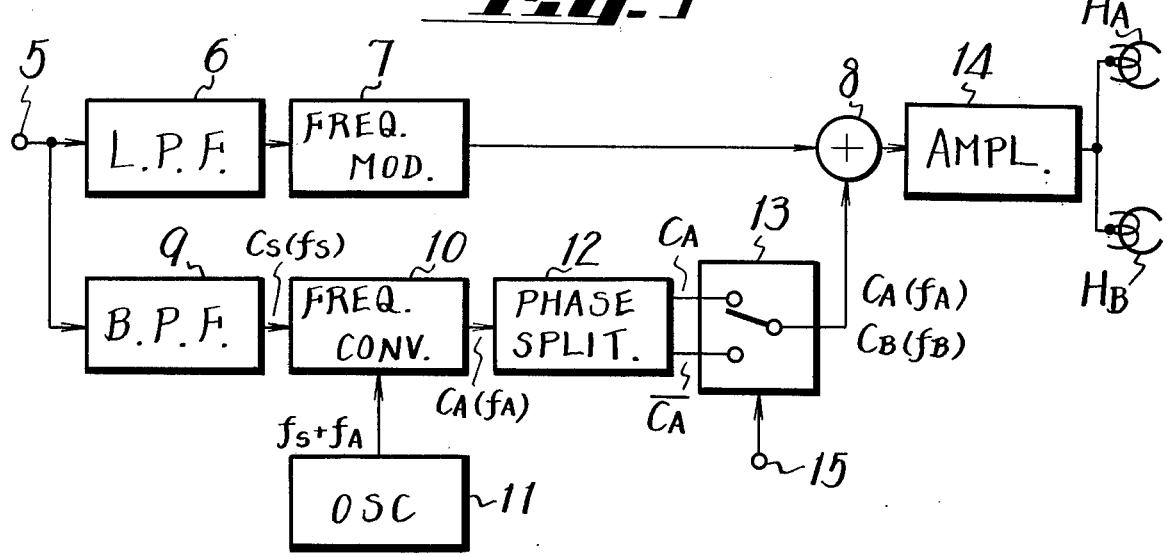
FIG. 5 is a block diagram showing one embodiment of a recording apparatus that may be used for providing the recording pattern shown on FIG. 4.

Referring now to FIG. 5, it will be seen that the basic circuit components of an apparatus for recording color video signals on the tape 2 in the previously described manner so as to permit the reproducing of the recorded signals in accordance with the present invention include an input terminal 5 which receives the color video signals to be recorded and is connected to a low pass filter 6 by which the luminance signals component is derived from the incoming signals. The luminance component separated from the incoming color video signals by filter 6 is applied to a frequency modulator 7 which produces a frequency-modulated luminance signal occupying the higher frequency portion of the recordable and reproducible frequency band and which is applied to an adder circuit 8. The incoming color video signals are also supplied from input terminal 5 to a band pass filter 9 which passes the chrominance signal component $C_S$ having the standard carrier frequency $f_S$ to a frequency converter 10. An oscillator 11 produces a frequency converting signal having a frequency $f_S + f_A$ which is also applied to frequency converter 10 so that the latter converts the chrominance signal component $C_S$ to a frequency-converted chrominance signal $C_A$ having the reduced or substantially lowered carrier frequency $f_A$. The frequency-converted chrominance signal $C_A$ is applied from the output of frequency converter 10 to a phase splitter 12 having positive and negative output terminals at which the frequency-converted chrominance signals $C_A$ and $\overline{C}_A$ respectively appear. The chrominance signal $C_A$ obtained at the positive output terminal of phase splitter 12 has a carrier with the same phase or polarity as the carrier of the output of frequency converter 10, while the chrominance signal $\overline{C}_A$ obtained at the negative output terminal of phase splitter 12 has the phase or polarity of its carrier reversed in respect to that of the chrominance signal $C_A$. The chrominance signals $C_A$ and $\overline{C}_A$ obtained at the positive and negative output terminals of phase splitter 12 are supplied to first and second input terminals of a switching circuit 13 controlled by a switching control signal $S_C$ (FIG. 6A) which is suitably produced, as hereinafter described in detail, and applied to a terminal 15 for selectively connecting a single output of switching circuit 13 with one or the other of its two input terminals. The single output of switching circuit 13 is shown to be connected to adder circuit 8 so that the latter will function to add the frequency-converted chrominance signal, as received from switching circuit 13, to the frequency-modulated luminance signal, whereupon the resulting or composite output of adder circuit 8 is supplied through a recording amplifier 14 to the magnetic heads or transducers $H_A$ and $H_B$ which are alternately operative to record the output of amplifier 14 in the tracks $T_A$ and $T_B$, respectively, on the magnetic tape.

Figure 6A:
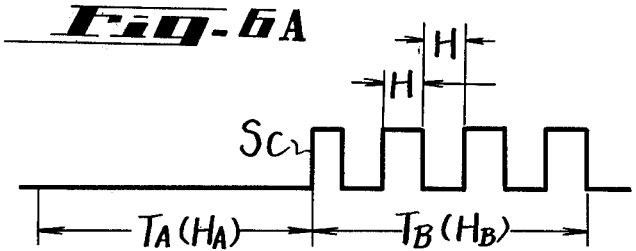
FIGS. 6A and 6B are waveform diagrams showing switching signals used during the recording and reproducing, respectively, of video signals according to this invention.

As is shown on FIG. 6A, the switching control signal $S_C$ is at a relatively low level for maintaining switching circuit 13 in the illustrated condition, that is, for applying the frequency-converted chrominance signal $C_A$ to the output of switching circuit 13, throughout each interval during which the magnetic head $H_A$ scans the tape, for example, for recording an odd-numbered field of the color video signals, in a respective one of the tracks $T_A$. On the other hand, during each period when the head $H_B$ scans the tape, for example, for recording an even-numbered field of the color video signals in a respective track $T_B$, the switching control signal $S_C$ is alternately at relatively high and relatively low levels during successive horizontal line intervals H of the color video signals. Thus, when recording in each track $T_B$, switching circuit 13 is alternately changed-over for successive horizontal line intervals between the condition that is the reverse of that shown on FIG. 5, that is, in which the frequency-converted chrominance signal $\overline{C}_A$ is supplied from the output of switching circuit 13 to adder circuit 8, and the condition illustrated on FIG. 5 in which the frequency-converted chrominance signal $C_A$ issues from the output of switching circuit 13.

With the foregoing switching control signal $S_C$ being applied to switching circuit 13, each odd-numbered field of the color video signals, as recorded in a respective one of the tracks $T_A$, is comprised of the frequency-modulated luminance signal and the frequency-converted chrominance signal $C_A$, with the carrier of such chrominance signal having the frequency $f_A$ and being of constant phase. On the other hand, during the recording of each even-numbered field of the color video signal in a respective one of the tracks $T_B$, the frequency-converted chrominance signal $C_A$ having the carrier frequency $f_A$ and the frequency-converted chrominance signal $\overline{C}_A$ having a carrier with the same frequency as the signal $C_A$, but which is out of phase with respect to the carrier of signal $C_A$, are alternately derived from switching circuit 13 at every horizontal line interval H. Such alternate derivation of the signals $C_A$ and $\overline{C}_A$ is equivalent to the signal $C_A$ being combined with rectangular wave signals which may be represented by "+1" and "−1" alternately at every horizontal interval. The above described alternate derivation of the signals $C_A$ and $\overline{C}_A$ is also equivalent to the signal $C_A$ being balance-modulated with a rectangular wave signal having a frequency that is one-half the horizontal line frequency $f_H$. Accordingly, each even-numbered field of the color video signals, as recorded in a respective one of the tracks $T_B$, is comprised of the frequency-modulated luminance signal and a frequency-converted chrominance signal $C_B$ having a carrier frequency $f_B$ which is shifted one-half $f_H$ relative to the carrier frequency $f_A$. In other words, the frequency-converted chrominance signals $C_A$ and $C_B$ which are recorded in adjacent tracks $T_A$ and $T_B$ on the magnetic tape 2 are in frequency interleaving relation to each other, as shown on FIGS. 7A and 7B, respectively.

Of course, the recording apparatus of FIG. 5 is provided with a suitable servo system (not shown) by which the rotation of transducers or heads $H_A$ and $H_B$ and the associated drum 1 is controlled in relation to the incoming color video signals which are to be recorded, for example, a servo system in which pulse signals generated by a pulse generator coupled with the shaft of drum 1 are compared with vertical synchronizing signals separated from the incoming video signals so as to maintain rotation of drum 1 at a speed of 30 revolutions per second with each of the heads $H_A$ and $H_B$ scanning the tape during a respective field interval of the incoming video signals. Further, the generation of the switching control signal $S_C$ is suitably coordinated with the rotation of heads $H_A$ and $H_B$ so as to ensure the recording of the frequency-converted chrominance signals $C_A$ and $C_B$ in the tracks $T_A$ and $T_B$ by the heads $H_A$ and $H_B$, respectively.

Figure 1:
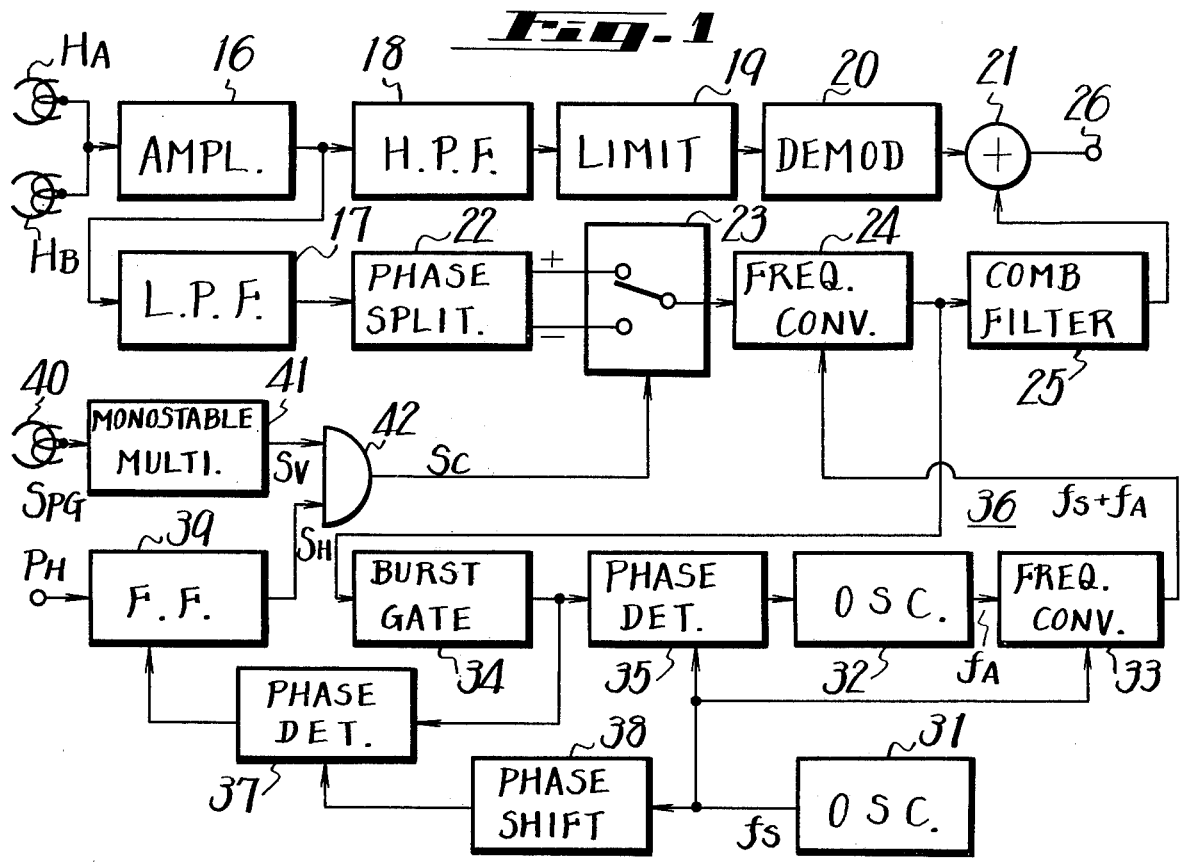
FIG. 1 is a block diagram showing one embodiment of a color video signal reproducing apparatus according to the invention.

Referring now to FIG. 1, it will be seen that an apparatus for reproducing color video signals recorded on tape 2 in the manner described above with reference to FIG. 5 includes magnetic heads $H_A$ and $H_B$ which may be the same as the recording heads $H_A$ and $H_B$, and which are suitably rotated so as to alternately scan the tape and reproduce the color video signals recorded in the tracks $T_A$ and $T_B$, respectively. Such reproduced color video signals are applied from heads $H_A$ and $H_B$ through a reproducing amplifier 16 to a low pass filter 17 and a high pass filter 18. The high pass filter 18 passes only the frequency-modulated luminance signal contained in the reproduced color video signal, and such frequency-modulated luminance signal is applied through a limiter 19 to a demodulator 20 so as to obtain the luminance signal which is, in turn, applied to an adder circuit 21. Since the heads $H_A$ and $H_B$ have different azimuth angles, as previously described, and the frequency-modulated luminance signal is of relatively high frequency, that is, occupies the upper portion of the recordable and reproducible frequency band, the so-called azimuth loss is substantially effective in respect to the frequency-modulated luminance signal. Thus, even if the head $H_A$ when scanning along a track $T_A$ also scans a portion of the adjacent track $T_B$ and, conversely, the head $H_B$ when scanning along a track $T_B$ also scans a portion of an adjacent track $T_A$, the adder circuit 21 is supplied with the demodulated luminance signal without any significant cross-talk.

The low pass filter 17 passes only the frequency-converted chrominance signals contained in the reproduced color video signals, and such output from filter 17 is applied to a phase splitter 22 having a positive output terminal (+) and a negative output terminal (−). The positive and negative output terminals of phase splitter 22 are connected to first and second input terminals of a switching circuit 23 which has a single output terminal selectively connected with the first and second input terminals of the switching circuit under the control of a switching control signal $S_C$ which is shown on FIG. 6B.

It will be apparent that, if the tracks $T_A$ and $T_B$ are recorded without guard bands therebetween, that is, in either contiguous or overlapping relation, the head $H_A$ when scanning a track $T_A$ during a reproducing operation will reproduce primarily the frequency-converted chrominance signal $C_A$ and, as cross-talk, the frequency-converted chrominance signal $C_B$ recorded in an adjacent track $T_B$ and which is in frequency interleaving relation with the signal $C_A$, as shown on FIG. 7C. Similarly, in scanning a track $T_B$ during a reproducing operation, the head $H_B$ will primarily reproduce the frequency-converted chrominance signal $C_B$ recorded in such track $T_B$ and also, as cross-talk, the frequency-converted chrominance signal $C_A$ which is recorded in an adjacent track $T_A$, and which is in frequency interleaving relation with the signal $C_B$, as shown on FIG. 7D. Thus, during scanning of a track $T_A$ by the head $H_A$, the output of filter 17 will be composed of the signal $C_A$ with which the signal $C_B$ is mixed in frequency interleaving relation as a cross-talk component (FIG. 7C), whereas, during the scanning of a track $T_B$ by the head $H_B$, the output of filter 17 will be composed of the signal $C_B$ with which the signal $C_A$ is mixed in frequency interleaving relation as a cross-talk component (FIG. 7D).

Figure 6B:
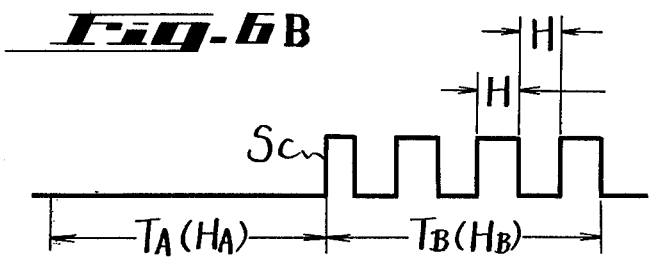

As is shown on FIG. 6B, the switching control signal $S_C$ for controlling the operation of switching circuit 23 is at a relatively low level so as to maintain switching circuit 23 in the illustrated condition, that is, to connect the positive output terminal (+) of phase splitter 22 to the output of switching circuit 23, throughout each period in which head $H_A$ is scanning a track $T_A$. On the other hand, during each period when head $H_B$ scans a track $T_B$, signal $S_C$ is alternately at relatively high and low levels in successive horizontal line intervals H so as to change-over switch circuit 23 between the condition in which the negative output terminal (−) of phase splitter 22 is connected to the output terminal of switching circuit 23 and the illlustrated condition in which the positive output terminal (+) of the phase splitter is connected to the output terminal of circuit 23, respectively, at successive horizontal line intervals H. Accordingly, when head $H_A$ scans a track $T_A$, the output of switching circuit 23 is composed of the frequency-converted chrominance signal $C_A$ and the frequency-converted chrominance signal $C_B$ mixed therewith as the cross-talk component, that is, the output of switching circuit 23 is then the same as the output of low pass filter 17 whic is obtained, without alteration, at the positive terminal of phase splitter 22. On the other hand, during the scanning of a track $T_B$ by the head $H_B$, the output of filter 17 is composed of the frequency-converted chrominance signal $C_B$ and the frequency-converted chrominance signal $C_A$ mixed therewith as the cross-talk component, as previously mentioned, but the signal $C_B$ is constituted by alternate repetitions of the signals $C_A$ and $\overline{C}_A$ at successive horizontal line intervals. Thus, during each horizontal line interval when the signal $C_B$ is constituted by the signal $C_A$, the output at the positive output terminal (+) of phase splitter 22 is primarily composed of the signal $C_A$ mixed with the signal $C_A$ as a cross-talk component, whereas, during every other horizontal line interval, that is, each line interval in which the signal $C_B$ is constituted by the signal $\overline{C}_A$, the output at the negative output terminal (−) of phase splitter 22 is composed of primarily the signal $C_A$ mixed with the signal $\overline{C}_A$ as a cross-talk component. Accordingly, if the switching control signal $S_C$ applied to switching circuit 23 is suitably synchronized, as hereinafter described in detail, during the scanning of a track $T_B$ by the head $H_B$ so that the output of switching circuit 23 is connected to the positive and negative output terminals of phase splitter 22 during those horizontal line intervals when the frequency-converted chrominance signal $C_B$ is constituted by the signals $C_A$ and $\overline{C}_A$, respectively, then the output of switching circuit 23 will be composed of the signal $C_A$ mixed, in alternate horizontal line intervals, with the signals $C_A$ and $\overline{C}_A$, that is, the signal $C_B$ as the cross-talk component.

Referring again to FIG. 1, it will be seen that the output of switching circuit 23 is applied to a frequency converter 24 which further receives a frequency converting signal having the frequency $f_S + f_A$ and by which the output of switching circuit 23 during the reproducing of signals from the tracks $T_A$ and $T_B$ is reconverted to chrominance signals $C_{SA}$ and $C_{SB}$, respectively, which have the standard or original carrier frequency $f_S$ and which are mixed with cross-talk components in frequency interleaving relation therewith, as shown on FIGS. 7E and 7F, respectively. Such alternately obtained chrominance signals $C_{SA}$ and $C_{SB}$ and the respective cross-talk components are applied to a comb filter 25 by which the cross-talk components mixed with the chrominance signals $C_{SA}$ and $C_{SB}$ are eliminated so as to obtain the original chrominance signal $C_S$ at the output of comb filter 25, as shown on FIG. 7G. Such chrominance signal $C_S$ is applied from the output of comb filter 25 to the adder circuit 21 so as to be combined with the luminance signal from demodulator 20 and thereby provide a reproduced composite color video signal which is free of cross-talk and is supplied to an output terminal 26.

As is shown on FIG. 8A, the comb filter 25 employed in the reproducing apparatus of FIG. 1 may simply comprise an input terminal 27 receiving the output of frequency converter 24 and being connected both directly and through a delay line 28 having a delay time equal to one horizontal line interval H, that is, approximately 1/15,750th of a second in the case of an NTSC signal, to a combining circuit 29 having an output terminal 30 connected to adding circuit 21. As is apparent from the response characteristic of comb filter 25 shown on FIG. 8B, the filter 25 transmits most readily those signals close to the standard chrominance carrier frequency $f_S$ which, in the case of an NTSC signal is approximately 3.58 MHz. The filter 25 also transmits, with somewhat greater attenuation, signals whose frequencies differ from the frequency $f_S$ by whole multiples of the frequency $f_H$ which is the horizontal line frequency. Thus, the comb filter 25 readily transmits the frequencies making up the chrominance signals $C_{SA}$ and $C_{SB}$ obtained from frequency converter 24 during the reproducing of signals recorded in tracks $T_A$ and $T_B$, respectively. However, the filter 25 substantially completely rejects signals having frequencies that differ from the frequency $f_S$ by odd multiples of $\frac{1}{2}f_H$, and these are exactly the frequencies of the cross-talk components which are mixed with the chrominance signals $C_{SA}$ and $C_{SB}$, as shown on FIGS. 7E and 7F.

It will be apparent from the above that, in the reproducing apparatus shown on FIG. 1, the phase splitter 22, switching circuit 23, frequency converter 24 and comb filter 25 constitutes a signal processing circuit by which the chrominance components of color video signals reproduced from record tracks $T_A$ and $T_B$, and which were recorded with respective carriers having different phases or polarity characteristics, are provided with a common carrier having the standard carrier frequency $f_S$ and the chrominance components of the cross-talk signals are eliminated on the basis of said different phases of the carriers with which the chrominance components were recorded in the next adjacent track $T_A$ and $T_B$.

In order to provide the frequency converting signal with the frequency $f_S + f_A$ for application to the frequency converter 24, the reproducing apparatus is further shown on FIG. 1 to comprise a fixed frequency oscillator 31 providing an oscillating output at the standard carrier frequency $f_S$, and a variable frequency or voltage controlled oscillator 32 having a central frequency of about $f_A$. The oscillating outputs of oscillators 31 and 32 having the frequencies $f_S$ and $f_A$, respectively, are applied to a frequency converter 33 which thereby produces the frequency converting signal with the frequency $f_S + f_A$. In order to control the variable frequency oscillator 32, the output of frequency converter 24 is applied to a burst gate circuit 34 by which the burst signals are extracted or derived from the reproduced chrominance signals following the reconversion of the latter to the standard carrier frequency. The extracted burst signals are supplied from burst gate circuit 34 to a phase detector or comparator circuit 35 which also receives the standard frequency output of fixed oscillator 31. The phase detector or comparator circuit 35 compares the phase of the burst signals extracted by gate circuit 34 with that of the standard frequency signal from oscillator 31 and, in response to any deviation therebetween, provides a suitably varied DC control voltage applied to variable frequency oscillator 32 for adjusting the oscillating output of the latter. Thus, the oscillators 31 and 32, frequency converter 33, burst gate circuit 34 and phase detector circuit 35 constitute an automatic phase control circuit 36 for the frequency converting signal applied to frequency converter 24.

In accordance with the present invention, changing over of the switching circuit or device 23 by the switching control signal $S_C$, particularly during the reproducing by head $H_B$ of signals recorded in a track $T_B$, is controlled in response to the phase of the common carrier of the chrominance component or signal that results therefrom so as to ensure phase alignment of the common carrier with which the chrominance components of the video signals reproduced from the successive tracks are provided. More particularly, as shown on FIG. 1, the burst signals extracted by gate circuit 34 from the output of frequency converter 24 are also applied to an additional phase detector or comparator circuit 37, and the standard frequency output of fixed frequency oscillator 31 is also applied to phase detector circuit 37 through a phase shifter or delay 38 which suitably shifts the phase of the standard frequency output of oscillator 31 as applied to detector circuit 37. So long as the frequency-converted chrominance signal $C_A$ of desired phase is obtained at the output of switch circuit 23, and hence the chrominance signal $C_S$ with the standard carrier frequency is obtained from frequency converter 24, the phases of the burst signals and of the standard frequency output of oscillator 31, as applied to phase detector circuit 37, will be coincident with each other so that the output of phase detector or comparator circuit 37 will be of negative polarity. On the other hand, if the signal $\overline{C}_A$ is obtained at the output of switch circuit 23 with the result that a chrominance signal $\overline{C}_S$ is obtained at the output of frequency converter 24 and has a carrier of the standard frequency which is reversed in phase relative to the carrier of the desired chrominance signal $C_S$, then the burst signal extracted from such chrominance signal $\overline{C}_S$ and applied to phase detector circuit 37 will be opposite in phase to that of the standard frequency output of oscillator 31 as applied to detector circuit 37 and the latter will respond to such condition by providing an output of positive polarity.

The circuit for producing the switching control signal $S_C$ is shown to further include a flip-flop 39 operated by horizontal synchronizing signals $P_H$ which may, for example, be suitably separated from the demodulated luminance signal obtained at the output of demodulator 20, so that flip-flop 39 produces a rectangular wave form signal $S_H$ (FIG. 9C) which is reversed at every horizontal line interval H. Further, a pulse generator 40 which may be associated with the shaft of drum 1 produces pulse signals $S_{PG}$ (FIG. 9A) for detecting or indicating the rotational positions of heads $H_A$ and $H_B$. Such pulse signals $S_{PG}$ are applied, for example, to a monostable multivibrator 41, so as to obtain a rectangular wave signal $S_V$ (FIG. 9B) which is "0" during each interval when head $H_A$ scans a track $T_A$ on tape 2 for reproducing an odd-numbered field $V_O$ of the recorded video signals, and "1" during each interval when the head $H_B$ scans a track $T_B$ for reproducing an even-numbered field $V_E$ of the recorded video signals. The rectangular wave signals $S_V$ and $S_H$ from multivibrator 41 and flip-flop 39, respectively, are applied to an AND gate circuit 42, and the output of the latter is connected to switching circuit 23 so as to provide the switching control signal $S_C$ therefor. Finally, the output of phase detector or comparator circuit 37 is connected to a reversing terminal of flip-flop 39 so as to immediately reverse the state of the output from flip-flop 39 whenever the output from phase detector circuit 37 is of positive polarity.

It will be apparent that the output of AND gate circuit 42, that is, the switching control signal $S_C$, will have a low level to dispose switching circuit 23 in the condition illustrated on FIG. 1, that is, to supply the output from the positive output terminal (+) of phase splitter 22 to frequency converter 24, when either of the rectangular wave signals $S_V$ and $S_H$ is "0" or at its lower level, and that the high level of switching control signal $S_C$ will be obtained for changing over switching circuit 23 to connect the negative output terminal (−) of phase splitter 22 to frequency converter 24, only when signals $S_V$ and $S_H$ are simultaneously "1" or at their high levels.

In view of the foregoing, during each interval when head $H_A$ is reproducing an odd-numbered field of the video signals recorded in a track $T_A$, the signal $S_V$ is continuously "0" so that the switching control signal $S_C$ obtained at the output of AND gate circuit 42 is also "0" or at a low level for maintaining switching circuit 23 in its illustrated condition. However, during the interval when head $H_B$ reproduces an even-numbered field of the video signals recorded in a track $T_B$, the signal $S_V$ is continuously "1" with the result that the switching control signal $S_C$ alternates between its high and low levels at every horizontal line interval H in correspondence with the alternating high and low levels of the signal $S_H$.

As previously indicated, when the head $H_B$ is reproducing an even-numbered field of the video signals recorded in a track $T_B$, the output of filter 17 consists primarily of the chrominance signals $C_A$, $\overline{C}_A$, $C_A$, $\overline{C}_A$—occurring in sequence for the successive horizontal line intervals of the even-numbered field $V_E$, as shown on FIG. 10B. If, at the commencement of the reproducing of an even-numbered field $V_E$ of the recorded video signals, the rectangular wave signal $S_H$ is such as to provide the output of flip-flop 39 with a relatively high level during a horizontal line interval when the chrominance signal $C_A$ is being obtained from filter 17, as shown on FIG. 10C, then the resulting switching control signal $S_C$ will change over switching circuit 23 to the condition opposite to that shown on FIG. 1 during each horizontal line interval when the chrominance signal $C_A$ is derived from filter 17, and to restore switching circuit 23 to the condition shown on FIG. 1 during each horizontal line interval when the chrominance signal $\overline{C}_A$ is being obtained from filter 17. As a result of the foregoing, the chrominance signal $\overline{C}_A$, rather than the desired chrominance signal $C_A$ will be continuously obtained from the output of switching circuit 23, as shown on FIG. 10D.

However, in the circuit arrangement according to the present invention, if the chrominance signal $\overline{C}_A$ is being obtained from the output of switching circuit 23 at the time $t_1$ when the first burst signal of the reproduced even-numbered field is extracted from the output of frequency converter 24, such extracted burst signal, as applied from burst gate 34 to phase detector circuit 37, will be out of phase in respect to the standard frequency output of oscillator 31 as also applied to phase detector circuit 37 so that the latter will apply a positive output $D_+$ (FIG. 10E) for immediately reversing the state or condition of flip-flop 39 at the time $t_1$, as shown in FIG. 10F. Thus, at the time $t_1$, switching circuit 23 will be changed over to the condition illustrated on FIG. 1 which is proper for the chrominance signal $C_A$ then being obtained from filter 17 and, thereafter, for the duration of the field $V_E$, switching circuit 23 will be controlled to alternately connect the negative output terminal (−) and the positive output terminal (+) of phase splitter 22 to frequency converter 24 during the horizontal line intervals in which the chrominance signals $\overline{C}_A$ and $C_A$, respectively, are obtained from filter 17. Accordingly, as shown in FIG. 10G, after the initial burst signal has been extracted to cause reversing of flip-flop 39, the switching circuit 23 will successively deliver chrominance signals $C_A$ to frequency converter 24 for the remainder of the even-numbered field $V_E$. During such times as the chrominance signals $C_A$ are being successively obtained from switching circuit 23, the corresponding burst signals being extracted from the output of frequency converter 24 will be in proper phase relation to the standard frequency signal as applied to phase detector circuit 37 so that negative outputs $D_-$ will be obtained fron the latter, as shown on FIG. 10E, with the result that flip-flop 39 will not be reversed thereby from the states determined by the horizontal synchronizing signals $P_H$. The foregoing operation of the circuit arrangement according to this invention occurs similarly if, at any time in the middle of the reproduction of an even-numbered field $V_E$, the burst signal extracted from the output of frequency converter 24 deviates in phase from the standard frequency signal applied from fixed frequency oscillator 31 through phase shifter 38 to phase detector circuit 37 so that the latter produces a positive output $D_+$ for reversing the state of flip-flop 39 and thereby reversing or changing-over the condition of switching circuit 23.

It will be apparent from the above that, by reason of the circuit arrangement according to this invention, the chrominance signals $C_A$ having a carrier of constant phase are substantially constantly obtained from switching circuit 23 so that the chrominance signal $C_S$ having a predetermined color phase or hue is obtained from comb filter 25. Even when the state of flip-flop 39 is reversed in response to a positive output from phase detector circuit 37, as previously described, so as to correct or shift the phase or hue, such shift occurs only during a single horizontal line interval and hence is not observable in a picture produced from the signals obtained at output terminal 26.

The importance of the phase detector circuit 37 provided in accordance with this invention for reversing the state of flip-flop 39 will be appreciated if, for the time being, it is assumed that such phase detector circuit 37 is omitted. In that case, the rectangular wave signal $S_H$ from flip-flop 39 may be as shown on FIG. 9C so as to produce the switching control signal $S_C$ during the reproducing of an even-numbered field $V_E$, as shown on FIG. 9D, and such switching control signal $S_C$ may cause the necessary changing-over of switching circuit 23 so that, as the chrominance signals $C_A$ and $\overline{C}_A$ are obtained alternately in successive horizontal line intervals at the output of filter 17, as shown on FIG. 11A, the desired chrominance signals $C_A$ are successively produced at the output of switching circuit 23, as shown on FIG. 11B. However, if the rectangular wave signal $S_H$ is the reverse of that shown on FIG. 9C to produce the switching control signal $S_C$ as shown on FIG. 9E, then the changing-over of switching circuit 23 will be the reverse of that achieved by the switching control signal shown on FIG. 9D and, accordingly, the chrominance signals $\overline{C}_A$ will be successively produced at the output of switching circuit 23 during the reproducing of each even-numbered field $V_E$, as shown on FIG. 11C. Accordingly, as is apparent from FIG. 11C, the chrominance signals obtained from switching circuit 23 will be reversed in phase for successive fields that is, on each change-over of reproducing by the head $H_A$ to reproducing by the head $H_B$. Although the automatic phase control circuit 36 does operate normally to maintain a predetermined constant carrier phase for the chrominance signal obtained at the output of frequency converter 24, phase corrections obtained by operation of the automatic phase control circuit 36 are not immediately effective. Therefore, if the carrier phase of the chrominance signal obtained at the output of switching circuit 23 is reversed on each change-over of the heads $H_A$ and $H_B$, the effect of the automatic phase control circuit 36 will not be immediately apparent, and hence the chrominance signal supplied to adding circuit 21 will have its hue deteriorated at the beginning of each field. On the other hand, when the phase detector circuit 37 is provided in accordance with the present invention, the reversal of the rectangular wave signals produced by flip-flop 39 from that shown on FIG. 9C resulting in the switching control signal $S_C$ shown on FIG. 9E will cause phase detector circuit 37 to detect the occurrence of the chrominance signal $\overline{C}_A$ in the output from switching circuit 23 upon the extraction of the first burst signal from the reproduced even-numbered field $V_E$, and will produce the positive output $D_+$ by which the state of flip-flop 39 is immediately reversed for restoring its rectangular wave signal $S_H$ to the configuration shown on FIG. 9C. Thus, the reversal of the state or condition of flip-flop 39 will occur only once and, thereafter, the desired chrominance signals $C_A$ will be uniformly obtained at the output of switching circuit 23 for avoiding any hue disturbance or deterioration in the chrominance signals supplied to adding circuit 21.

In the above description of operation of the reproducing apparatus according to this invention, it has been assumed that the cross-talk components mixed with the chrominance signals in the output from frequency converter 24 have negligible, if any effects on the operation of phase detector circuit 37 in maintaining carrier phase alignment of the chrominance signals successively issuing from the frequency converter. That assumption is justified so long as the color video signals recorded in adjacent tracks are in true H-alignment so that, when reproducing the signals recorded in one of the tracks, each of the burst signals contained therein will occur at the same time as a burst signal included in the chrominance component being simultaneously reproduced as cross-talk from each adjacent track. Further, the level of the burst signal included in the chrominance component of the video signals being reproduced by the head $H_A$ or $H_B$ from the track being scanned thereby is substantially higher than the level of the simultaneously occurring burst signal in the cross-talk component. Therefore, even though the phases of the simultaneously occurring burst signals are reversed in respect to each other, the burst signal obtained from the burst gate circuit 34 and applied to phase detector circuit 37 is coincident in phase with the burst signal in the chrominance component of the video signal being reproduced from the track scanned by one or the other of the heads and, accordingly, phase detector circuit 37 operates as described above for maintaining phase alignment of the chrominance carrier for the successive chrominance signals applied to adding circuit 21.

However, if the positions $T_H$ at which the horizontal synchronizing signals $P_H$ are recorded in adjacent tracks $T_A$ and $T_B$ are slightly shifted relative to each other, as shown on FIG. 12A, so that the burst signal for each horizontal line interval of the video signals being reproduced from one of the tracks occurs at a different time than the burst signal in the cross-talk component, a problem may occur. For example, when head $H_B$ is reproducing color video signals recorded in track $T_B$ the burst signals included in the chrominance signal $C_B$ being reproduced from track $T_B$ are alternately reversed in phase as obtained at the output of filter 17, and as indicated at B,$\overline{B}$,B,$\overline{B}$,—on FIg. 12A. However, due to the phase splitter 22 and the switching action of switching circuit 23, the burst signals as obtained at the output of switching circuit 23, and hence as extracted by burst gate circuit 34, are of constant phase so that negative outputs $D_-$ are obtained from phase detector circuit 37, as indicated on FIG. 12B, and no reversal of the state of flip-flop 39 occurs by reason of the burst signals included in the video signals being reproduced from track $T_B$. On the other hand, the burst signals included in the chrominance signal $C_A$ being reproduced from the adjacent track $T_A$ as the cross-talk component are of constant phase at the output of filter 17, as indicated at B,B,B,—on FIG. 12A, but such burst signals contained in the cross-talk component are alternately reversed in phase at the output of switching circuit 23 and as extracted by the burst gate circuit 34. Therefore, the burst signals of the cross-talk component cause phase detector circuit 37 to alternately produce negative and positive outputs $E_-$ and $E_+$ which are in lagging relation to the negative outputs $D_-$ provided by phase detector circuit 37 in response to the burst signals of the video signals being reproduced from track $T_B$ (FIG. 12B). If the level of the cross-talk component is relatively low, the alternating negative and positive outputs $E_-$ and $E_+$ from phase detector circuit 37 present no problem. However, if the level of the cross-talk component becomes relatively high so that any one of the positive outputs $E_+$ extends above the voltage level which is required for triggering or reversing the state of flip-flop 39, and which is shown by hatched lines on FIG. 12B, then flip-flop 39 is reversed by such positive output $E_+$ to cause a spurious change in the switching action of switching circuit 23. As a result of such spurious or incorrect change in the switching action of switching circuit 23, the chrominance signal derived from comb filter 25 will not be of the normal or desired phase until the switching action of switching circuit 23 is again corrected by the previously described control operations.

In order to avoid the foregoing problem, a reproducing apparatus according to this invention may be arranged as shown on FIG. 13, in which the various components of the reproducing apparatus corresponding to those included in the apparatus described above with reference to FIG. 1 are identified by the same reference numerals. In the embodiment of the invention shown on FIG. 13, the burst gate circuit 34 has its input connected to the output of comb filter 25, rather than to the output of frequency converter 24, as in the embodiment of FIG. 1. In the embodiment of FIG. 13, since the cross-talk component is eliminated from the output of comb filter 25, the burst gate circuit 34 can only extract the burst signals included in the chrominance component of the video signals recorded in the track being scanned by the head $H_A$ or $H_B$, and there is no danger that phase detector circuit 37 will provide a false positive output for reversing the state of flip-flop 39 in response to burst signals in the cross-talk component.

However, when the phase detecting circuit 37 in the embodiment of FIG. 13 detects an error in the carrier phase of the chrominance signal $C_S$ obtained at the output of comb filter 25 and, accordingly, reverses the state of flip-flop 39 for changing the switching action of switching circuit 23, the effect thereof on the chrominance signal at the output of comb filter 25 is slightly different from that of the embodiment shown on FIG. 1. More particularly, if the switching control signal $S_C$ (FIG. 14C) and hence the switching action of switching circuit 23, are not proper during the reproducing by head $H_B$ of an even-numbered field $V_E$ from a track $T_B$, the chrominance signals issuing from switch 23 and from comb filter 25 for the first horizontal line interval of such field $V_E$ have carriers of incorrect phase, as indicated at $\overline{C}_A$ and $\overline{C}_S$ on FIG. 14D with the result that a positive output $D_+$ (FIG. 14G) is obtained from phase detector circuit 37 at the time $t_1$ when the first burst signal in the field $V_E$ is extracted from the output of comb filter 25 by burst gate circuit 34, whereby to reverse the state of flip-flop 39, as shown on FIG. 14H. As a result of such reversal of the state of flip-flop 39, the control of switching circuit 23 is thereafter proper for continuously deriving the chrominance signals $C_A$ of the desired constant carrier phase at the output of switching circuit 23, and for similarly deriving chrominance signals $C_S$ of the desired constant carrier phase at the output of frequency converter 24, as shown on FIG. 14D. However, in the comb filter 25, the chrominance signals $\overline{C}_S, C_S, C_S, C_S$—issuing from the output of frequency converter 24, as shown on FIG. 14D, are combined or mixed with such signals delayed by one horizontal line interval, as shown on FIG. 14E. Therefore, in the chrominance signals issuing from the output of comb filter 25, the hue is changed in the horizontal line interval in which the first burst signal is obtained, as indicated at $\overline{C}_S$ on FIG. 14F, there is no chrominance signal in the next horizontal line interval, and the normal or desired hue or carrier phase is obtained for all of the following horizontal line intervals, as shown on FIG. 14F. If, for any reason, flip-flop 39 has its state reversed for similarly reversing the condition of switching circuit 23 in the middle of the reproducing of an even-numbered field $V_E$, the same phenomenon occurs, that is, the chrominance signal is dropped from the output of comb filter 25 during the horizontal line interval which immediately follows that in which the state of flip-flop 39 is reversed.

In the signal processing circuits of the recording apparatus of FIG. 5 and of the reproducing apparatus of each of FIGS. 1 and 13, the frequency-converting signals $f_S + f_A$ applied to the frequency converter 10 or 24 is of constant phase and the chrominance signal is supplied to the phase splitter 12 or 22 before or after its frequency conversion, respectively, so as to obtain the chrominance signals $C_A$ and $\overline{C}_A$ which are then selectively passed through the switching circuit 13 or 23 under the control of the switching control signal $S_C$ for obtaining the recording or reproducing operation, as described above. However, the present invention may also be embodied in apparatus having signal processing circuits for the chrominance signals in which, in the case of recording, the output of filter 9 on FIG. 5 is supplied to frequency converter 10 and the output of the latter is supplied directly to the adding circuit 8 and, in the case of reproducing, the output of filter 17 on FIG. 1 or FIG. 13 is directly supplied to frequency converter 24 and the output from the latter is supplied through comb filter 25 to the adding circuit 21, and further in which the phase of the frequency-converting signal $f_S + f_A$ applied to the frequency converter 10 or 24 is suitably reversed from time to time under the control of the switching control signal $S_C$ so as to effect the previously described recording and reproducing operation. More particularly, as shown on FIG. 15, a frequency-converting signal having the frequency $f_S + f_A$, which may be obtained from the oscillator 11 (FIG. 5) in the case of recording or from the frequency converter 33 (FIGS. 1 and 13) in the case of reproducing, is supplied to the input of a phase splitting amplifier 43 having positive and negative output terminals (+) and (−) which are respectively connected to first and second input terminals of a switching circuit 44 having a single output terminal connected to the frequency converter 10 or 24. As in the case of the switching circuit 13 or 23 of the previously described recording and reproducing apparatus, the switching circuit 44 is controlled by the switching control signal $S_C$ so as to selectively apply the frequency-converting signal to frequency converter 10 or 24 with either the phase thereof obtained at the positive output terminal (+) of phase splitting amplifier 43 or with the reversed phase as obtained at the negative output terminal (−) of the phase splitting amplifier. As in the previously described reproducing apparatus embodying this invention, a reproducing apparatus provided with the arrangement shown on FIG. 15 will similarly extract burst signals from the chrominance signals obtained at the output of frequency converter 24 or comb filter 25 and detect or compare the phase of such burst signals, as in the phase detector circuit 37, with the phase of the standard frequency signal from oscillator 31, with the resulting output from phase detector circuit 37 being then used to control the switching condition of switching circuit 44 in the same way as has been described above in connection with the reproducing apparatus of FIG. 1 or 13.

Figure 16:
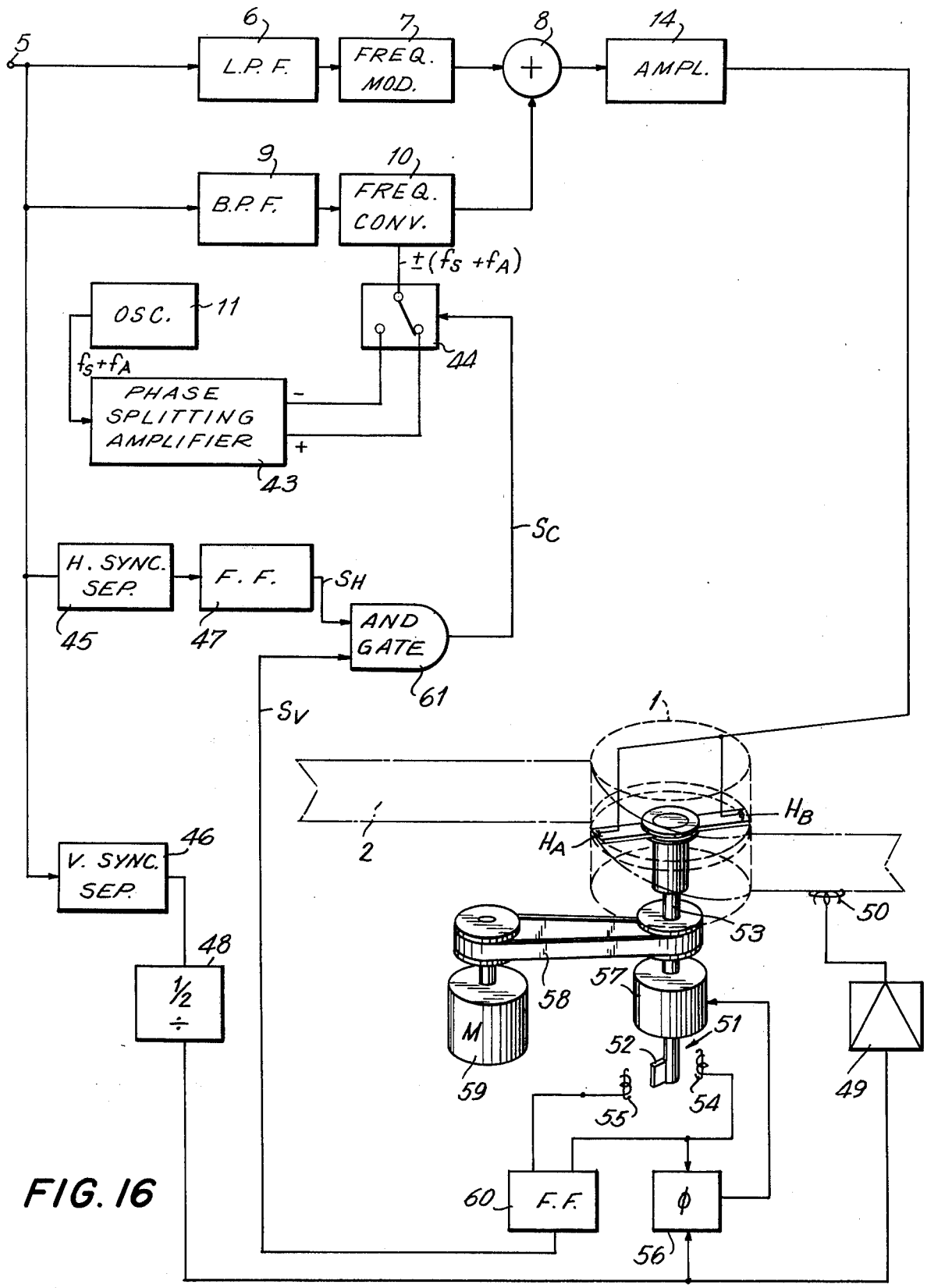
FIGS. 16 and 17 are block diagrams of apparatus for recording and reproducing, respectively, color video signals in accordance with still another embodiment of this invention.

Referring now to FIG. 16, it will be seen that, in a recording apparatus which, for example, embodies the arrangement shown on FIG. 15 for selectively reversing the phase of the frequency converting signal applied to frequency converter 10, and in which the components corresponding to those described above with reference to FIGS. 5 and 15 are identified by the same reference numerals, the incoming color video signals applied to input terminal 5 are supplied therefrom to a horizontal sync separator 45 and to a vertical sync separator 46. The horizontal sync separator 45 is connected to a flip-flop 47 and the vertical sync separator 46 is connected to a divider 48. The divider 48 is operative to provide control signals at a repetition rate which is a predetermined fraction $1/(2 \times n)$ of the repetition rate of the separated vertical synchronizing signals, in which $n$ is the number of field intervals to be recorded in each of the tracks $T_A$ and $T_B$. In the case where one field interval is recorded in each of the tracks, the repetition rate of the control signals issuing from divider 48 is one-half the repetition rate of the vertical synchronizing signals and the divider 48 may be constituted by a flip-flop. Of course, the number $n$ may be less than one, for example, one-half field interval may be recorded in each of the tracks, in which case the repetition rate of the control signal is equal to the repetition rate of the vertical synchronizing signals. In all cases, it will be seen that the control signals issuing from divider 48 occur in correspondence with the recording of video signals in alternating or every other one of the tracks so as to identify or distinguish between the tracks $T_A$ and $T_B$ in which the chrominance signals $C_A$ and $C_B$ with different carriers are respectively recorded.

The control signals from divider 48 are applied through an amplifier 49 to a fixed transducer 50 which is located adjacent the path of tape 2 for recording the control signals at spaced apart locations along a longitudinal edge of the tape. Since the control signals have a repetition rate equal to one-half the repetition rate of the field intervals and one field interval of the video signals is recorded in each of the tracks, it is apparent that the recorded control signals will be in predetermined positional relationship to every other one of the tracks, that is, either the tracks $T_A$ or the tracks $T_B$.

The control signals from divider 48 are also shown to be employed in a servo system for regulating the movements of heads $H_A$ and $H_B$ relative to tape 2. As shown, such servo system comprises pulse generating means 51 for producing pulse signals upon the operative positioning of each of the heads $H_A$ and $H_B$ relative to tape 2, for example, as each of the heads begins to scan a respective track on the tape. The pulse generating means 51 may include a magnet 52 fixed on the drive shaft 53 for the heads, and a pair of diametrically opposed transducers or coils 54 and 55 located along the circular path of movement of magnet 52, as shown. Thus, as head $H_A$ commences to move along a respective track $T_A$ on tape 2, magnet 52 passes coil 54 and causes the latter to emit a pulse signal. Similarly, coil 55 emits a pulse signal as head $H_B$ commences to move along a track $T_B$ on tape 2. Every other one of the pulse signals from pulse generating means 51, for example, the pulse signals from coil or pulse generator 54 are applied to a phase comparator circuit 56 which also receives the control signals from divider 48. The comparator circuit 56 compares the phases of the control signals and of the pulse signals from coil or pulse generator 54 and provides a corresponding brake control or regulating signal which controls a brake 57 on shaft 53. As is shown, the shaft 53 for rotating heads $H_A$ and $H_B$ may be driven through a belt and pulley transmission 58 by a motor 59 so that the brake 57, in response to the brake control or regulating signal from comparator circuit 56, more or less resists turning of shaft 53 for either decreasing or increasing the speed of movement of heads $H_A$ and $H_B$ so that each of the latter will commence its movement along a respective record track on tape 2 at the commencement of a field interval of the video signals being recorded.

In order to produce the switching control signal $S_C$ for controlling switching circuit 44 in synchronization with the recording of the video signals by heads $H_A$ and $H_B$, the pulse signals from transducers or coils 54 and 55 are applied to the reset and set terminals, respectively, of a flip-flop 60 and the output of the latter is applied to an AND circuit or gate 61 which also receives the output of flip-flop 47. Finally, the output of AND circuit or gate 61, which constitutes the switching control signal $S_C$, is applied to switching circuit 44 for controlling the latter. It will be seen that flip-flop 47 produces a first switch control signal similar to the signal $S_H$ shown on FIG. 9C, and which is at a high level for periods corresponding to every other one of the horizontal line intervals, while flip-flop 60 produces a second switch control signal similar to the signal $S_V$ shown on FIG. 9B, that is, which is at a high level for each field interval during which head $H_B$ is operative to record the video signals in a corresponding track $T_B$ on the tape.

The recording apparatus shown on FIG. 16 operates substantially in the same manner as has been described above with reference to FIG. 5 except that, in the case of the apparatus shown on FIG. 16, the fixed head or transducer 50 applies a control or track identifying signal to tape 2 at a location along the latter which is in predetermined positional relation to each record track $T_A$ in which the video signals are recorded by head $H_A$ so that, during reproducing of the recorded video signals as hereinafter described, such control or track identifying signals can be employed for distinguishing between the tracks $T_A$ in which the video signals have been recorded with chrominance carriers of constant phase, and the tracks $T_B$ in which the video signals have been recorded with the phase of the chrominance carrier being reversed in successive horizontal line intervals. Further, in the recording apparatus of FIG. 16, during the recording of each odd-numbered field $V_O$ in a track $T_A$ by head $H_A$, switching control signal $S_C$ from AND gate 61 maintains switching circuit 44 in the illustrated condition so that frequency-converting signal $f_S + f_A$ is applied from the positive output terminal (+) of amplifier 43 to frequency converter 10 with a constant pulse so as to record the chrominance signal $C_A$ in the respective track. On the other hand, during the recording of each even-numbered field $V_E$ in a track $T_B$ by head $H_B$, the switching control signal $S_C$ from AND gate 61 causes repeated changing over of switching circuit 44 at successive horizontal line intervals so that the phase of the frequency-converting signal $f_S + f_A$, as applied to frequency converter 10, is reversed at each horizontal line interval, whereby to record the chrominance signal $C_B$ in such track $T_B$.

Figure 17:
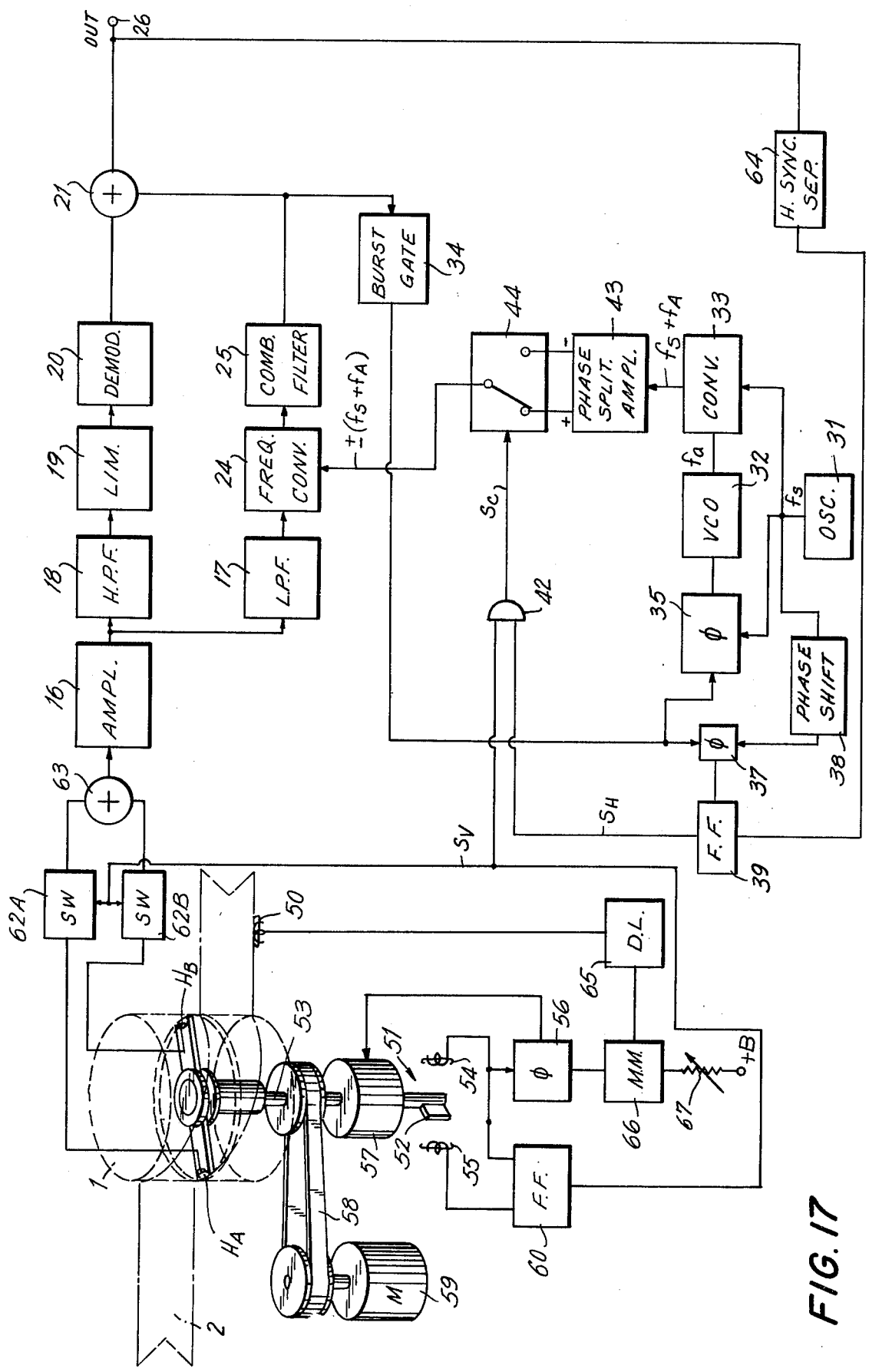

FIG. 17 shows a playback or reproducing apparatus for reproducing video signals recorded by the apparatus of FIG. 16, and in which many of the components are identical with those described above with reference to FIGS. 13, 15 and 16 and are identified by the same reference numerals. In the reproducing apparatus of FIG. 17, the heads $H_A$ and $H_B$ are operated as reproducing transducers and are connected through alternately closed switches 62A and 62B, respectively, and an adding or combining circuit 63 to the input of the reproducing amplifier 16. Further, a horizontal sync separator 64 is connected to the output of demodulator 20 or to the output of adding circuit 21, as shown, for separating horizontal synchronizing signals from the respective output and applying the same to the flip-flop 39 which has its output $S_H$ applied to one input of the AND circuit or gate 42. In the embodiment shown on FIG. 17, the signal $S_V$ applied to the other input of AND gate 42 is derived from flip-flop 60. As previously described in connection with the recording apparatus or mode of operation illustrated on FIG. 16, the reset and set terminals of the flip-flop 60 in the reproducing apparatus or mode of operation receive the pulse signals from the transducers or coils 54 and 55, respectively, of pulse generating means 51 so that the signal $S_V$ is at its relatively high level only during the reproducing of an even-numbered field $V_E$ in a track $T_B$ by the head $H_B$. The signal $S_V$ is further employed to control switches 62A and 62B alternately so that, even though there is normally some overlap of the signals reproduced by heads $H_A$ and $H_B$, such overlap is eliminated in the reproduced video signals combined in adding circuit 63.

In the reproducing apparatus or mode of operation shown on FIG. 17, the fixed head or transducer 50 reproduces the recorded control signals which distinguish the tracks $T_A$ having the chrominance signals $C_A$ recorded therein with a carrier of constant phase from the tracks $T_B$ in which the chrominance signals $C_B$ are recorded with the carrier thereof having its phase reversed in successive horizontal line intervals. The reproduced control or track identifying signals are applied from fixed head 50 through a suitable delay line 65 to a monostable multivibrator 66 which is provided with a variable resistor 67 for varying its time constant, that is, the duration of its output signal initiated by each of the reproduced control or track identifying signals. The output signals from monostable multivibrator 66 are applied to one input of phase comparator circuit 56 which, at its other input, receives the pulse signals from coil or generator 54, and which controls the brake 57 on the basis of a phase comparison of its two inputs. It will be apparent that, by reason of the described arrangement, the rotation of transducers or heads $H_A$ and $H_B$ will be controlled so that head $H_A$ will commence its movement across tape 2 only when a track $T_A$ is positioned to be scanned by such head $H_A$, and, similarly, so that head $H_B$ will commence its movement across tape 2 only when a track $T_B$ is positioned to be scanned by the head $H_B$. Thus, the reproducing apparatus of FIG. 17 assures that the production of the signal $S_V$ will be properly synchronized with the reproducing of signals from the tracks $T_A$ and $T_B$ so as to maintain switching circuit 44 in the illustrated condition during the reproducing from a track $T_A$ of video signals recorded with a constant chrominance carrier phase, and to changeover switching circuit 44 at successive horizontal line intervals during the reproducing from a track $T_B$ of video signals recorded therein with the phase of its chrominance signal carrier reversed at successive horizontal line intervals. It will further be noted that, as described above with reference to chrominance signal processing circuit of FIG. 15, in the reproducing apparatus of FIG. 17, the output of low pass filter 17, that is, the chrominance signals $C_A$ and $C_B$ respectively separated from the reproduced signals recorded in tracks $T_A$ and $T_B$, are applied directly to frequency converter 24, and that the frequency-converting signal $f_S + f_A$ produced by frequency converter 33 is applied to the phase splitting amplifier 43 which has its positive and negative output terminals (+) and (−) connected to the first and second inputs of switching circuit 44 which, in turn, has its single output connected to frequency converter 24. By reason of the switching control signal $S_C$ applied from AND circuit 42 to switching circuit 44, the frequency-converting signal $f_S + f_A$ is applied with a constant phase to frequency converter 24 during the passage through the latter of a chrominance signal $C_A$ reproduced from a track $T_A$, whereas, during the passage through frequency converter 24 of a chrominance signal $C_B$ reproduced from a track $T_B$, the frequency-converting signal $f_S + f_A$ applied to frequency converter 24 from switching circuit 44 has its phase reversed at successive horizontal line intervals. Apart from the foregoing specifically mentioned features of operation of the reproducing apparatus of FIG. 17, such apparatus operates in substantially the same manner as the embodiments of this invention described above with reference to FIGS. 1 and 13.

In all of the above described embodiments of this invention, it has been assumed that the color video signals being recorded and reproduced are in accordance with the NTSC system. However, the invention can be also applied to the recording and reproducing of color video signals according to the PAL system. As is known, the chrominance carrier in the PAL system is offset from one of the high harmonics of the line frequency $f_H$ by only one-quarter ($f_H$) instead of one-half ($f_H$) as in the NTSC system. Thus, in the apparatus of FIGS. 1, 5, 13, 15, 16 and 17, during the recording and reproducing of color video signals in accordance with the PAL system in and from each track $T_B$, the switching control signal $S_C$ is given a repetition rate of one-quarter ($f_H$). This corresponds to recording two horizontal line intervals with the carrier of the chrominance signal having one phase or polarity and the succeeding two horizontal line intervals with a chrominance carrier of the opposite phase or polarity, and is consistent with the fact that the carrier of one of the chrominance components in a PAL color video signal is inverted in alternate line intervals.

Although particular embodiments of the invention have been described in detail herein with reference to the accompanying drawings, it is to be understood that the invention is not limited to those precise embodiments, and that various changes and modifications, in addition to those specifically referred to above, may be effected by one skilled in the art without departing from the scope or spirit of the invention as defined in the appended claims.

What is claimed is:

1. In an apparatus for reproducing video signals having luminance and chrominance signal components and comprised of field intervals and line intervals which are recorded in respective areas of successive parallel tracks on a record medium with said chrominance signal components of video signals recorded in next adjacent tracks having different first and second carriers: the combination of rotational transducer means for scanning along said tracks one at a time so as to reproduce the video signals recorded in each of said tracks along with cross-talk signals from the tracks next adjacent thereto, pulse signal generating means for producing pulse signals indicating the rotational positioning of said transducer means, means for separating said chrominance signal components from the luminance signal components in the reproduced signals, means for extracting horizontal synchronizing signals from said reproduced signals, signal processing means for providing the separated chrominance signal components of video signals reproduced from each of said tracks with a common carrier and for eliminating from the resultant chrominance signal components the chrominance signal components of the cross-talk signals on the basis of said different first and second carriers with which the chrominance signal components are recorded in the tracks which are next adjacent to each other, phase detecting means for detecting phase reversals of said common carrier of said resultant chrominance signal components, and means for controlling said signal processing means in response to said pulse signals, said horizontal synchronizing signals and said phase detecting means so as to maintain continuity of the phase of said common carrier of the resultant chrominance signal components.

2. An apparatus according to claim 1; in which said signal processing means includes frequency-converting means receiving said separated chrominance signal components and providing said common carrier therefor, and comb-filter means receiving the output of said frequency-converting means for eliminating therefrom said chrominance signal components of the cross-talk signals; and in which said phase detecting means includes means for extracting burst signals from said resultant chrominance signal components and which are representative of the phase of said common carrier, and means for comparing the phase of said burst signals with the phase of a standard frequency signal.

3. An apparatus according to claim 2; in which the video signals are recorded in said next adjacent tracks with different azimuth angles, said transducer means includes first and second reproducing heads having gaps with said different azimuth angles, respectively, and reproducing the video signals recorded in the tracks with the respective azimuth angles, and said luminance signal components of the recorded video signals are in a relatively high frequency band so that azimuth loss is effective to minimize said luminance signal components in said cross-talk signals.

4. An apparatus according to claim 2; further comprising fixed oscillater means for producing said standard frequency signal of constant phase, and automatic phase control means for maintaining the phase of said common carrier of the resultant chrominance signal components substantially constant in respect to said phase of the standard frequency signal.

5. An apparatus according to claim 1; in which said signal processing means includes switching means changeable between first and second conditions for reversing the phase of said common carrier of the resultant chrominance signal components, and said means for controlling the signal processing means includes means for producing a switching control signal for said switching means and which changes the condition of the latter in response to the detection by said phase detecting means of a phase reversal of said common carrier of the resultant chrominance signal components.

6. An apparatus according to claim 5; in which said first carrier is of constant phase and said second carrier has its phase reversed at every predetermined number of said line intervals; and in which said means for producing said switching control signal includes means responsive to said pulse signals and said horizontal synchronizing signals for maintaining said switching control signal at a first level corresponding to said first condition of said switching means during reproducing of video signals recorded with said first carrier and for changing said switching control signal between said first level and a second level corresponding to said second condition of the switching means at each said predetermined number of the line intervals, and means for changing the switching control signal between said first and second levels thereof in response to said detection by the phase detecting means of a phase reversal of said common carrier of the resultant chrominance signal components.

7. An apparatus according to claim 6; in which said signal processing means includes fixed oscillator means for producing a standard frequency signal, and said phase detecting means compares the phase of said common carrier of the resultant chrominance signal components with the phase of said standard frequency signal.

8. An apparatus according to claim 7; further comprising phase shifting means for shifting the phase of said standard frequency signal to be compared with the phase of said common carrier.

9. An apparatus according to claim 6; in which said signal processing means includes phase splitting means receiving the separated chrominance signal components of video signals reproduced from each of said tracks and having positive and negative output terminals connected with said switching means and at which said separated chrominance signal components are derived with the phases of said carrier of the latter reversed in respect to each other.

10. An apparatus according to claim 9; in which said first and second carriers with which the chrominance signal components are recorded in said adjacent tracks, respectively, have frequencies substantially below a standard carrier frequency for said chrominance signal components; and in which said signal processing means further includes a frequency converter receiving the output of said switching means, and means for applying a frequency-converting signal to said frequency converter so as to cause the latter to provide said common carrier with said standard carrier frequency.

11. An apparatus according to claim 10; in which said signal processing means further includes comb filter means receiving the output of said frequency converter and eliminating therefrom said chrominance signal components of the cross-talk signals.

12. An apparatus according to claim 6; in which said first and second carriers with which the chrominance signal components are recorded in said adjacent tracks, respectively, have frequencies substantially below a standard carrier frequency for said chrominance signal components; and in which said signal processing means includes a frequency converter receiving said separated chrominance signal components of the video signals reproduced from each of said tracks, means for producing a frequency-converting signal, and phase splitting means receiving said frequency-converting signal and having positive and negative output terminals at which said frequency-converting signal is obtained with its phase relatively reversed, and said switching means is connected between said phase splitting means and said frequency converter for selectively applying said frequency converting signal to said frequency converter from said positive and negative output terminals so as to cause said frequency converter to provide said common carrier with said standard carrier frequency.

13. An apparatus according to claim 12; in which said signal processing means further includes comb filter means receiving the output of said frequency converter for removing therefrom said chrominance signal components of the cross-talk signals.

14. An apparatus according to claim 1; in which control signals are recorded on said record medium in predetermined positional relation to said tracks so as to distinguish the tracks in which the chrominance signal components are recorded with said first and second carriers, respectively; and further comprising means for reproducing said control signals recorded on the record medium, and means for regulating the movement of said transducer means in dependence on comparison of the reproduced control signals with said pulse signals.

15. An apparatus according to claim 1; further comprising adding means for combining said resultant chrominance signal components, from which the cross-talk signals have been eliminated, with the separated luminance signal components.

16. An apparatus according to claim 1; in which the ends of the margins between successive areas in which said second intervals are recorded in each of said tracks are aligned, in the direction transverse to the length of the tracks, with the adjacent ends of the margins between the successive areas in which said second intervals are recorded in the next adjacent tracks.

17. In an apparatus for reproducing video signals having luminance and chrominance signal components and comprised of field intervals and line intervals which are recorded in respective areas of successive parallel tracks on a record medium with said chrominance signal components of video signals in next adjacent tracks respectively having a first carrier of constant phase and a second carrier whose phase is reversed after every predetermined number of line intervals of the video signals recorded with said second carrier: the combination of a plurality of transducers which are movable in respect to the record medium so as to be successively operatively positioned relative to said record medium for reproducing the video signals recorded in each of said tracks along with cross-talk signals from the tracks next adjacent thereto; pulse signal generating means for producing pulse signals indicative of the operative positioning of said transducers; means for separating said chrominance signal components from the luminance signal component in the reproduced signals; means for providing the separated chrominance signal components of video signals reproduced from each of said tracks with a common carrier and for eliminating therefrom the chrominance signal components of the cross-talk signals including processing means for the chrominance signal components of the reproduced signals having a first output condition in which processed signals are derived with the phases of their carriers are recorded and a second output condition in which the processed signals have their carrier phases reversed, comb filter means having a delay period equal to one of said line intervals and receiving said processed signals, and switching means for continuously establishing said first output condition of the processing means during the reproducing of video signals having the chrominance signal components recorded with said first carrier and for alternately establishing said first and second output conditions of the processing means after each said predetermined number of line intervals during the reproducing of video signals having the chrominance signal components thereof recorded with said second carrier; means for extracting horizontal synchronizing signals from the reproduced signals; phase detecting means for detecting reversals of the carrier phase of said processed signals; and means for controlling said switching means in response to said pulse signals, said horizontal synchronizing signals and said phase detecting means so as to maintain continuity of the phase of said carrier of the processed signals.

18. An apparatus according to claim 17; in which control signals are recorded on said record medium in predetermined positional relation to said tracks so as to distinguish the tracks in which the chrominance signal components are recorded with said first and second carriers, respectively; and further comprising means for reproducing said control signals recorded on the record medium, and means for regulating the movement of said transducers in dependence on comparison of the reproduced control signals with said pulse signals.

19. An apparatus according to claim 18; in which said transducers consist of first and second transducers which are alternately operatively positioned for reproducing the chrominance components of said video signals with said first and second carriers, respectively, and said pulse signal generating means includes first and second pulse generators which respectively produce first and second pulse signals upon the operative positioning of said first and second transducers, respectively; and in which said means for regulating said movement of the transducers includes means for comparing the phases of said first pulse signals and of said reproduced control signals.

20. An apparatus according to claim 19; in which said transducers are driven in a circular path for said movement relative to the record medium; and said means for regulating the movement of said transducers further includes brake means for variably braking said movement of the transducers in said circular path in dependence on a brake regulating signal from said means comparing the phases of said first pulse signals and of said reproduced control signals.

21. An apparatus according to claim 19; in which said record medium is magnetic, said first and second transducers are magnetic and have gaps with substantially different azimuth angles, said luminance component of the recorded video signals frequency modulates a carrier, and said first and second carriers for the chrominance signal components of the recorded signals have frequencies below the band of frequencies of the frequency modulated luminance signal component; and further comprising means for frequency demodulating the luminance signal component separated from the chrominance signal components in the reproduced video signals.

22. An apparatus according to claim 17; in which said switching means has first and second conditions corresponding to said first and second output conditions, respectively, of said processing means; and in which said means for controlling the switching means includes flip-flop means having first and second states which are alternated by said extracted horizontal synchronizing signals for producing first switch control signals for periods corresponding to every other one of said line intervals, means operated by said pulse signals for producing second switch control signals for periods corresponding to every other one of said field intervals, and means receiving said first and second switch control signals for normally establishing said first condition of the switching means and for establishing said second condition of the switching means in response to concurrence of said first and second switch control signals, and said flip-flop means is connected with said phase detecting means so that the latter reverses the state of said flip-flop means upon detection of a reversal in the carrier phase of said processed signals.

23. An apparatus according to claim 22; in which said processing means includes phase splitting means receiving the separated chrominance signal components of video signals reproduced from each of said tracks and having positive and negative output terminals connected with said switching means and at which said separated chrominance signal components are derived with the phases of said carrier of the latter reversed in respect to each other.

24. An apparatus according to claim 23; in which said first and second carriers with which the chrominance signal components are recorded in said adjacent tracks, respectively, have frequencies substantially below a standard carrier frequency for said chrominance signal components; and in which said processing means further includes a frequency converter receiving the output of said switching means, and means for applying a frequency-converting signal to said frequency converter so as to cause the latter to provide said processed signals with said standard carrier frequency.

25. An apparatus according to claim 22; in which said first and second carriers with which the chrominance signal components are recorded in said adjacent tracks, respectively, have frequencies substantially below a standard carrier frequency for said chrominance signals components; and in which said processing means includes a frequency converter receiving said separated chrominance signal components of the video signals reproduced from each of said tracks, means for producing a frequency-converting signal, and phase splitting means receiving said frequency-converting signal and having positive and negative output terminals at which said frequency-converting signal is obtained with its phase relatively reversed, and said switching means is connected between said phase splitting means and said frequency converter for selectively applying said frequency converting signal to said frequency converter from said positive and negative output terminals so as to cause said frequency converter to provide said processed signals with said standard carrier frequency.

26. An apparatus according to claim 22; further comprising means for extracting burst signals from said processed signals in advance of said comb filter means; and in which said phase detecting means receives the extracted burst signals for detecting therein said reversals of the carrier phase of said processed signals.

27. An apparatus according to claim 22; further comprising means for extracting burst signals from the output of said comb filter means; and in which said phase detecting means receives the extracted burst signals for detecting therein said reversals of the carrier phase of the processed signals.

28. An apparatus according to claim 17; in which the ends of the margins between successive areas in which said line intervals are recorded in each of said tracks are aligned, in the direction transverse to the length of the tracks, with the adjacent ends of the margins between the successive areas in which said line intervals are recorded in the next adjacent tracks.

* * * * *